US008442481B2

(12) United States Patent
Maier et al.

(10) Patent No.: US 8,442,481 B2
(45) Date of Patent: May 14, 2013

(54) EMERGENCY LOCATION INFORMATION GATEWAY FOR PUBLIC SAFETY ANSWERING POINTS (PSAPS) AND METHOD OF USE

(75) Inventors: Nicholas M. Maier, Menlo Park, CA (US); William L. Mertka, Geneva, IL (US)

(73) Assignee: RedSky Technologies, Inc., Chicago, IL (US)

( * ) Notice: Subject to any disclaimer, the term of this patent is extended or adjusted under 35 U.S.C. 154(b) by 271 days.

(21) Appl. No.: 12/844,972

(22) Filed: Jul. 28, 2010

(65) Prior Publication Data

US 2010/0317317 A1 Dec. 16, 2010

Related U.S. Application Data

(63) Continuation-in-part of application No. 11/803,671, filed on May 15, 2007, now Pat. No. 7,937,067.

(60) Provisional application No. 60/800,774, filed on May 16, 2006, provisional application No. 60/800,775, filed on May 16, 2006, provisional application No. 60/800,776, filed on May 16, 2006, provisional application No. 60/800,777, filed on May 16, 2006, provisional application No. 61/229,414, filed on Jul. 29, 2009, provisional application No. 61/230,154, filed on Jul. 31, 2009.

(51) Int. Cl.
*H04M 11/04* (2006.01)
(52) U.S. Cl.
USPC .................. 455/404.2; 455/404.1; 455/456.1

(58) Field of Classification Search .................. None
See application file for complete search history.

(56) References Cited

U.S. PATENT DOCUMENTS

| | | | |
|---|---|---|---|
| 6,363,138 B1 | 3/2002 | Aprile | |
| 6,665,611 B1 * | 12/2003 | Oran et al. | 701/472 |
| 7,302,250 B2 | 11/2007 | Chin et al. | |
| 7,313,402 B1 | 12/2007 | Rahman | |
| 7,330,464 B2 | 2/2008 | Brouwer et al. | |
| 7,336,968 B2 | 2/2008 | Diroo et al. | |
| 7,352,847 B2 | 4/2008 | Goldman et al. | |
| 7,356,343 B2 | 4/2008 | Feher | |
| 7,366,157 B1 | 4/2008 | Valentine et al. | |
| 7,379,729 B2 | 5/2008 | Holland et al. | |
| 7,420,963 B1 | 9/2008 | Shankar et al. | |
| 7,424,310 B1 | 9/2008 | Barbeau | |
| 7,433,673 B1 | 10/2008 | Everson et al. | |
| 7,450,568 B2 | 11/2008 | Shim et al. | |
| 7,469,138 B2 | 12/2008 | Dayar et al. | |
| 7,480,374 B2 | 1/2009 | Rollender | |
| 7,496,182 B2 | 2/2009 | Coster et al. | |
| 7,508,922 B2 | 3/2009 | Colunga | |

(Continued)

*Primary Examiner* — Erika A Washington
(74) *Attorney, Agent, or Firm* — Lesavich High-Tech Law Group, P.C.; Stephen Lesavich

(57) ABSTRACT

The emergency location information gateway provides Public Safety Answering Points (PSAPs) with the capability to receive NG911-compliant (i.e., Session Initiation Protocol (SIP-based) and/or SIP-Voice over Internet Protocol (VoIP)) and other types emergency calls including embedded emergency location information and determine a physical location of a mobile or non-mobile target network device based on the embedded emergency location information. Conversely, a legacy network gateway (LGN) enables the conversion of traditional 911, and E911 calls into NG911 calls for transport and dissemination by so-called Emergency Services IP networks, or ESInets.

20 Claims, 19 Drawing Sheets

U.S. PATENT DOCUMENTS

| | | |
|---|---|---|
| 7,535,994 B1 | 5/2009 | Hines, III et al. |
| 7,548,158 B2 | 6/2009 | Titus et al. |
| 7,573,982 B2 | 8/2009 | Breen et al. |
| 7,586,902 B2 | 9/2009 | Epley |
| 7,598,031 B2 | 10/2009 | Liew |
| 7,602,886 B1 | 10/2009 | Beech et al. |
| 7,602,887 B1 | 10/2009 | Croak et al. |
| 7,609,203 B2 | 10/2009 | Dockemeyer, Jr. et al. |
| 7,612,181 B2 | 11/2009 | Wu et al. |
| 7,623,447 B1 | 11/2009 | Faccin et al. |
| 7,623,842 B2 | 11/2009 | Levitan |
| 7,639,792 B2 * | 12/2009 | Qiu et al. ................. 379/207.15 |
| 7,662,558 B2 | 2/2010 | Liew |
| 7,664,509 B2 | 2/2010 | Zeller |
| 7,676,215 B2 | 3/2010 | Chin et al. |
| 7,689,200 B1 | 3/2010 | Zeller |
| 7,702,081 B1 | 4/2010 | Klesper et al. |
| 7,734,019 B1 | 6/2010 | Terpstra |
| 7,734,021 B1 | 6/2010 | Croak et al. |
| 7,756,254 B1 | 7/2010 | Croak et al. |
| 7,773,584 B2 | 8/2010 | Gorti et al. |
| 7,773,975 B2 | 8/2010 | Snapp et al. |
| 7,787,856 B1 | 8/2010 | Klesper et al. |
| 7,796,738 B2 | 9/2010 | Wright |
| 7,796,998 B1 * | 9/2010 | Zellner et al. ............... 455/456.1 |
| 7,825,780 B2 | 11/2010 | Pitt |
| 7,826,598 B1 | 11/2010 | Prozeniuk et al. |
| 7,826,599 B2 | 11/2010 | Goldman et al. |
| 7,839,982 B2 | 11/2010 | Dalrymple et al. |
| 7,844,281 B2 | 11/2010 | Burke |
| 7,848,733 B2 | 12/2010 | Bull et al. |
| 7,848,769 B2 | 12/2010 | Fuller, Jr. et al. |
| 7,873,033 B2 | 1/2011 | Krause et al. |
| 7,873,369 B2 | 1/2011 | Zellner et al. |
| 7,937,067 B2 | 5/2011 | Maier et al. |
| 2005/0090225 A1 | 4/2005 | Muehleisen et al. |
| 2005/0105496 A1 | 5/2005 | Ambrosino |
| 2005/0169248 A1 * | 8/2005 | Truesdale et al. ............... 370/352 |
| 2007/0013516 A1 | 1/2007 | Freitag et al. |
| 2007/0139191 A1 | 6/2007 | Quatro |
| 2007/0270164 A1 | 11/2007 | Maier et al. |
| 2010/0297981 A1 * | 11/2010 | Ballantyne et al. ........ 455/404.2 |
| 2010/0311385 A1 | 12/2010 | Hurwitz |
| 2010/0317317 A1 | 12/2010 | Maier et al. |
| 2011/0207429 A1 | 8/2011 | Maier et al. |
| 2011/0208710 A1 | 8/2011 | Lesavich |
| 2012/0225635 A1 | 9/2012 | Esbensen |
| 2012/0278622 A1 | 11/2012 | Lesavich et al. |

* cited by examiner

From: "joesmith"<sip:192.1.1.90>;tag=ffehedbc11
To: <sip:192.1.1.80> Geolocation:
<cid:192.1.1.90>
Accept: application/pidf+xml
Cseq: 1 INVITE
Call-Id: 79398930@192.1.1.90
<?xml version="1.0" encoding="UTF-8"?>
<presence xmlns="urn:ietf:params:xml:ns:pidf"
entity="sip : 192.1. 1. 90">
 <tuple id="lisLocation">
  <status>
   <geopriv>
    <location-info>     <civicAddress>
    <country>USA</country>
     <a1>IL</a1>
     <a3>Chicago</a3> <prd>W</prd>
     <a6>Chicago Ave</a6>
     <hno>925</hno>  <pc>60  642</
    pc>  </civicAddress>  </location-
    info>
   </geopriv>
  </status>
  <timestamp>2008-04-23 T17:32:27 GMT-05:00</
 timestamp> </tuple>
</presence>

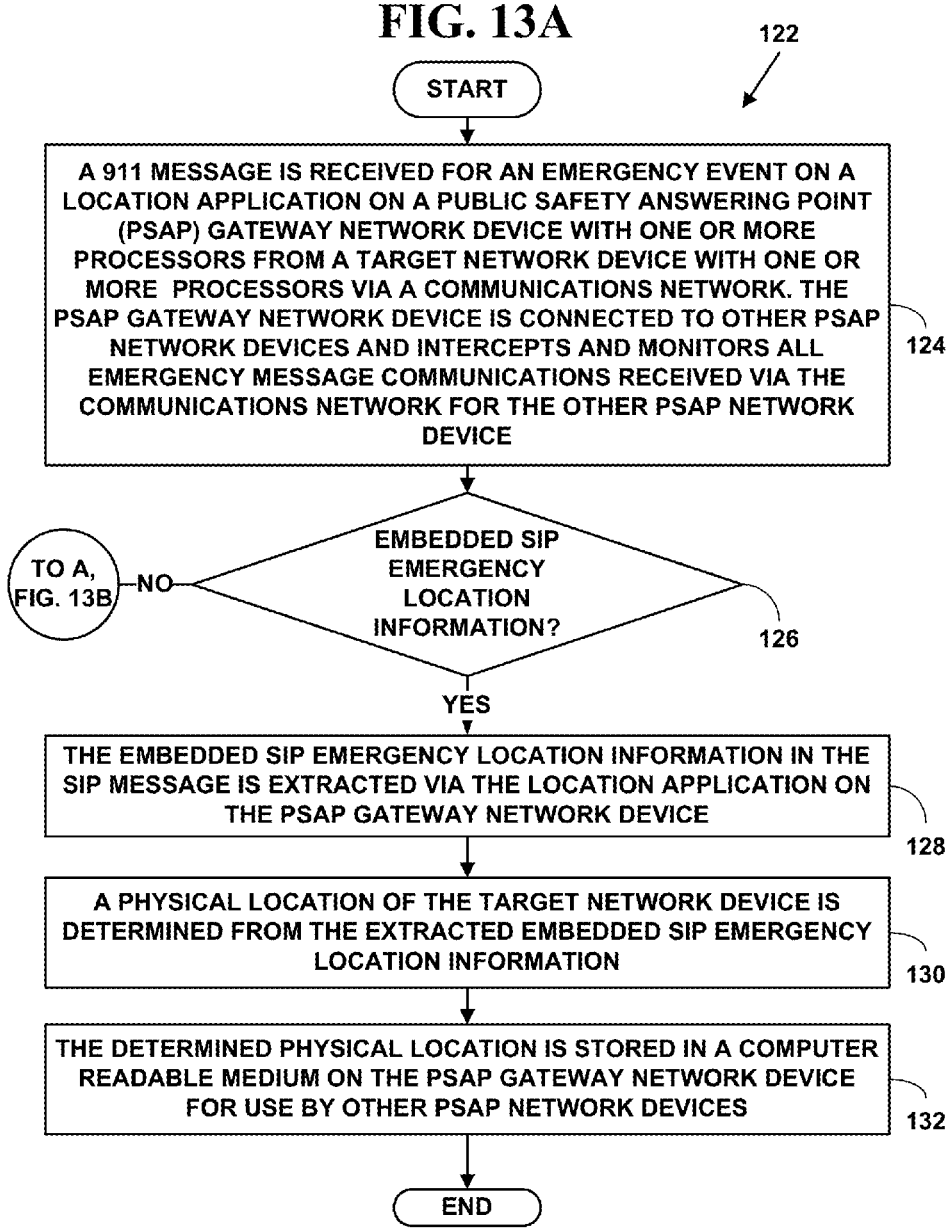

FIG. 14 140
144
PSAP GATEWAY ADDR:192.1.1.80
CALLER: JOE SMITH
EMERGENCY TYPE: FIRE
911 CALL TYPE: NG-911
VoIP-SIP ID: 192.1.1.90
SIP CID: 190.1.1.90
CALLER ID: 31279398930@192.1.1.90
PHYSICAL ADDRESS: 925 W. Chicago Avenue, Suite 300 Chicago, IL 60642 (See ADDR: B (FIG. 1))
PC:60:41
GEO-LOCATION IN PHYSICAL ADDRESS: $2^{ND}$ FLOOR IN 2 STORY BUILDING, $1^{ST}$ OFFICE EAST FROM NW CORNER
TIME STAMP:2009-04-23 T17:32:27GMT-05:00
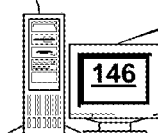
142
146
118
FIG. 12A
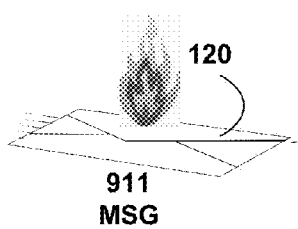
120
911 MSG
116
FIG. 12A

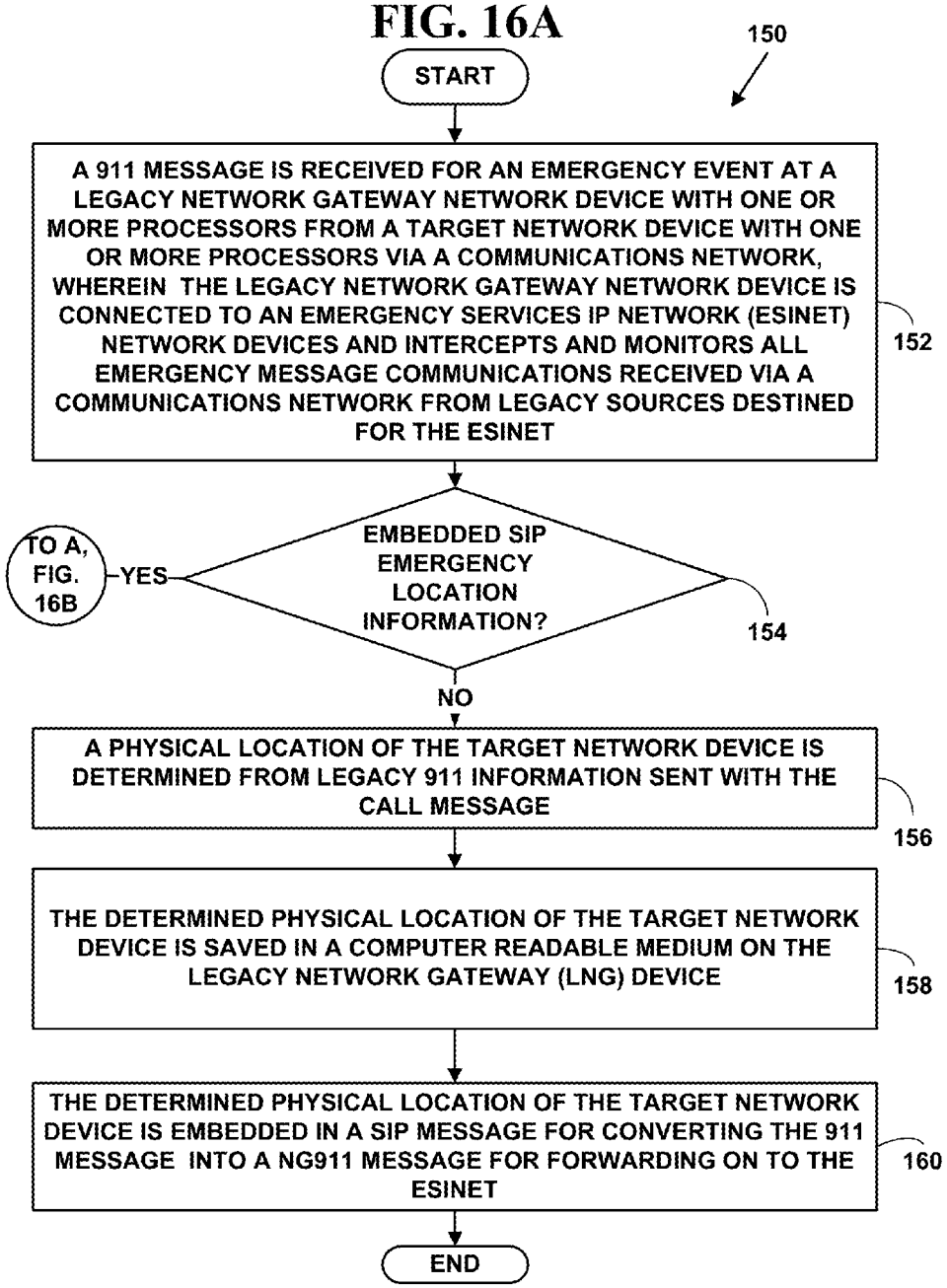

EMERGENCY LOCATION INFORMATION GATEWAY FOR PUBLIC SAFETY ANSWERING POINTS (PSAPS) AND METHOD OF USE

CROSS REFERENCES TO RELATED APPLICATIONS

This utility patent application is a Continuation-In-Part (CIP) of U.S. utility application 11/803,671, filed May 15, 2007, which claims priority to U.S. Provisional patent application Nos. 60/800,774, 60/800,775, 60/800,776, 60/800, 777, all filed May 16, 2006, U.S. utility application 11/803, 671 issued as U.S. Pat. No. 7,937,067 on May 3, 2011, the contents of all of which is incorporated by reference. This utility application also claims priority to U.S. Provisional patent application Nos. 61/229,414, filed Jul. 29, 2009, and 61/230,154, filed Jul. 31, 2009, the contents of all of which are also incorporated by reference.

FIELD OF INVENTION

This application relates to automatic processing of location information. More specifically, it relates to an emergency location information gateway for public service answering points (PSAP) and a method of use.

BACKGROUND OF THE INVENTION

In many emergency situations it is of great importance to be able to quickly and accurately locate individuals within a large building. For example, in the event of a fire, public safety personnel may need to operate within an unfamiliar building on short notice, in conditions of poor visibility due to smoke or flame. Accurate location information is vital to coordinate rescue operations and ensure the safety of firefighters. Police or military personnel may be faced with similar circumstances, in which accurate and timely location information can help avoid friendly-fire incidents and coordinate action against a criminal or enemy force.

In Next Generation (NG) 911, physical location is important not only for emergency dispatch, but also for real-time call/session routing decisions. In order for this architecture to work, all calls/sessions need to carry their physical location information in the messaging stream itself. What is more, traditional PSAPs, not upgraded to "take" these "location-enabled" NG911 calls need to be able to accommodate them.

Individuals faced with an emergency involving immediate danger to life or health of themselves or a colleague need to be able to accurately provide their location to emergency/rescue personnel, preferably without human intervention to enable rescue in the case where the individual in need is incapacitated, or all attention must be devoted to his/her protection. In all these circumstances, rapid and automated acquisition of the location of an individual to within a few meters within a large building can be critical in saving lives.

Prior art methods of accomplishing such location do not simultaneously meet the requirements of rapid location determination, automation, and accuracy. Navigation employing conventional maps and visual observation or dead reckoning are not readily automated and thus require time and attention by a human observer. Manual navigation may be vitiated in the case where visibility is impacted by flame or smoke, or where personnel are under hostile fire and unable to establish their location by patient observation.

Enhanced 911, (E911) is a location technology that enables mobile, or cellular phones and other mobile device such personal digital/data assistants (PDAs) to process 911 emergency calls and enable emergency services to locate a physical geographic position of the device and thus the caller. When a person makes a 911 call using a traditional phone with wires, the call is routed to the nearest public safety answering point (PSAP) that then distributes the emergency call to the proper emergency services. The PSAP receives the caller's phone number and the exact location of the phone from which the call was made. Prior to 1996, 911 callers using a mobile phone would have to access their service providers in order to get verification of subscription service before the call was routed to a PSAP. In 1996 the Federal Communications Commission (FCC) ruled that a 911 call must go directly to the PSAP without receiving verification of service from a specific cellular service provider. The call must be handled by any available service carrier even if it is not the cellular phone customer's specific carrier.

The FCC has rolled out E911 in two phases. In 1998, Phase I required that mobile phone carriers identify the originating call's phone number and the location of the signal tower, or cell, accurate to within a mile. In 2001, Phase II required that each mobile phone company doing network-based location detection capability so that the caller's location is determined by the geographic location of the cellular phone within 100 meter accuracy and not the location of the tower that is transmitting its signal. The FCC refers to this as Automatic Location Identification (ALI).

There are many problems associated with determining a location of device and a caller who needs to place an E911 call in an emergency. On problem is that many E911 calls a misrouted to the wrong PSAP. This can delay the dispatch of emergencies services to the caller. Another problem is that existing mobile technology makes its difficult to accurately locate mobile devices.

Another problem is that triangulation based on time of arrival at multiple mobile-communications base stations (TDOA) has inadequate coverage and is insufficiently accurate unless supplemented by signals provided by local radios placed outside the facility by public safety personnel.

Another problem is that conventional radio-frequency-based location methods do a poor job of providing topological location within a building: that is, location relative to walls, doors, partitions, stairways, and other features whose spatial extent is small but whose significance to a person's ability to move is great.

Another problem is that many mobile devices are not "location-aware." Location-aware devices are aware of their current geographic location. Mobile telephones and Global Positioning System ("GPS") devices may be aware of their current geographic location. GPS devices typically determine their current geographic location by communicating with satellites. However, mobile telephones may only determine their current geographic location by communicating with a particular mobile phone interface or telephony switch that provides coverage to a geographic location such as a telephony "cell" but not an exact current geographic location within the cell.

Another problem is that many communications networks do not correctly provide emergency location information to public service answering points (PSAPs).

Thus, there exists a critical need for a method of locating individuals making an E911 call that is rapid, automated, accurate, simple and inexpensive to employ, and does not require manual intervention from the person to be located. Accordingly, the need also exists for "gateway" equipment that can either: (a) transform legacy 911 calls into NG911 calls, with physical location information included with the call; or (b) transform a location enabled call back into a traditional 911 call so that it can be handled by legacy PSAP Customer Premises Equipment (CPE). The need to provide transformations of NG9-1-1 call "in both directions".

SUMMARY OF THE INVENTION

In accordance with preferred embodiments of the invention, some of the problems associated with transforming legacy 911 calls so that NG911-elements (i.e., IP-based technology) can be used in conjunction with legacy E911 (TDM-based) equipment are overcome. An emergency location information gateway for public service answering points (PSAPs) is provided as well as a similar gateway for network service providers, public safety jurisdictions, or other users to use in transforming legacy 911 calls into NG9-1-1 calls/sessions.

The emergency location information gateway provides Public Safety Answering Points (PSAPs) with the capability to receive NG911-compliant (i.e., Session Initiation Protocol (SIP-based) and/or SIP-Voice over Internet Protocol (VoIP)) and other types emergency calls including embedded emergency location information and determine a physical location of a mobile or non-mobile target network device based on the embedded emergency location information. Conversely, a legacy network gateway (LGN) enables the conversion of traditional 911, and E911 calls into NG911 calls for transport and dissemination by so-called Emergency Services IP networks, or ESInets.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 12A and 12B are block diagrams illustrating emergency location information gateway components;

FIGS. 13A and 13B are a flow diagram illustrating a method for receiving emergency calls with embedded emergency location information;

FIG. 14 is a block diagram of a screen shoot of a PSAP display system displaying physical location information for a target network device making an 911 call for an emergency event;

FIGS. 16A and 16B are a flow diagram illustrating a method a method for receiving emergency calls without embedded emergency location information.

DETAILED DESCRIPTION OF THE INVENTION

Exemplary Electronic Information Message Processing System

Figure 1:
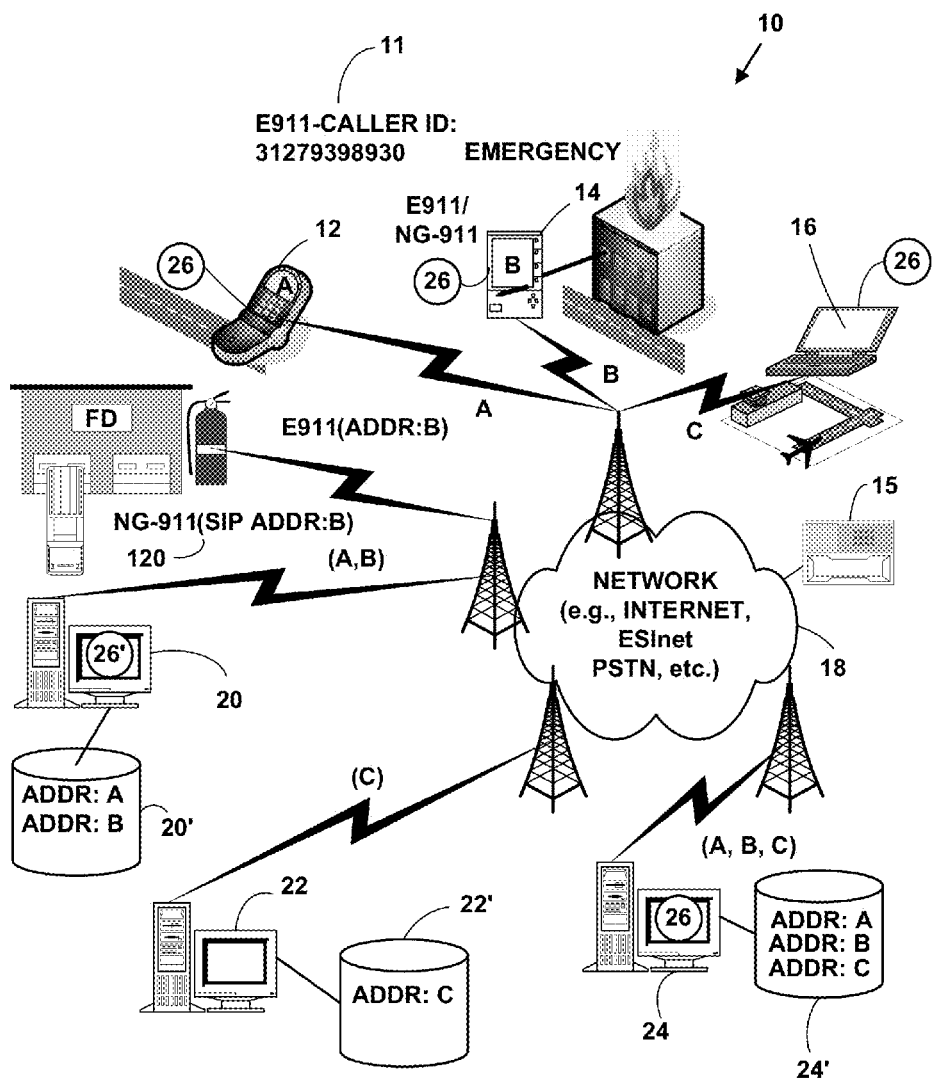
FIG. 1 is a block diagram illustrating an exemplary electronic information processing system.

FIG. 1 is a block diagram illustrating an exemplary communications system 10. The exemplary communications system 10 includes, but is not limited to, one or more target network devices 12, 14, 16 (only three of which are illustrated). The target network devices 12, 14, 16 include, but are not limited to, mobile phones, non-mobile phones, non-mobile computers, wireless devices, wired devices, game devices, laptop computers, personal information devices, personal digital/data assistants (PDA), hand-held devices, network appliances, Internet appliances, two-way pagers, etc. However, the present invention is not limited to these target electronic devices and more, fewer or others types of target electronic devices can also be used. The target network devices 12, 14, 16 function as client devices in some instances and server devices in other instances. The target network devices 12, 14, 16 may be wireless or wired as illustrated by non-mobile phone 15.

In one embodiment the target network devices 12, 14, 16 are "smart" devices. A smart device is aware of its location in (X,Y,Z) space or geo-space. In another embodiment, the target network device 12, 14, 16 are "dumb" device. A dumb device is not aware of its location in geo-space. A dumb device is typically in contact with proxy server device that is aware of the dumb device's location in geo-space.

The mobile network devices 12, 14, 16 are in communications with a communications network 18. The communications network 18 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN), mesh networks and other types of wired and wireless communications networks 18 providing voice, video and data communications with wired or wireless communication protocols. In one embodiment, the communications network 18 includes a Emergency Services Internet Protocol (IP) Network (ESInet) 18.

Plural server network devices 20, 22, 24 (only three of which are illustrated) include one or more associated databases 20', 22', 24'. The plural server network devices 20, 22, 24 are in communications with the one or more target network devices 12, 14, 16 via the communications network 18. The plural server network devices 20, 22, 24, include, but are not limited to, wireless or wired communications servers, wireless access points, proxy servers and other types of server devices.

The communications network 18 may include one or more gateways, routers, bridges, switches and/or session border controllers. As is known in the art, a gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer and therefore support virtually any packet protocol. A session border controller is a device used in some Voice over Internet Protocol (VoIP) networks to exert control over the signaling and usually also the media streams involved in setting up, conducting, and tearing down voice and data calls or other interactive media communications. Session border controllers usually reside between two service provider networks in a peering environment, or between an access network and a backbone network to provide service to residential and/or enterprise customers.

In one embodiment, the target network devices 12, 14, 16 and the server network devices 20, 22, 24 include a location application 26 with plural software modules. The multiple software modules may be implemented in firmware, hardware or any combination thereof. In one embodiment, the target network devices 12, 14, 16 may include a plug-in 28 for a browser with plural software modules. In another embodiment, the plural target network devices 12, 14, 16 and plural server devices 20, 22, 24 do not include a location application or browser plug-in.

The communications network 18 may also include one or more servers or access points (AP) including wired and wireless access points (WiAP) (e.g., 20).

The communications network 18 includes data networks using the Transmission Control Protocol (TCP), User Datagram Protocol (UDP), Internet Protocol (IP) and other data protocols.

The communications network 18 may also include wired interfaces connecting portions of a PSTN or cable television network that connect the target network devices 12, 14, 16 via the Public Switched Telephone Network (PSTN) or a cable television network (CATV) including high definition television (HDTV) that connect the target network devices 12, 14, 16 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others.

The communications network 18 may also include digital and analog cellular services, Commercial Mobile Radio Services (CMRS), including, mobile radio, paging and other wireless services. The communications network 18 includes a cellular telephone network, Personal Communications Services network ("PCS"), Packet Cellular Network ("PCN"), Global System for Mobile Communications, ("GSM"), Generic Packet Radio Services ("GPRS"), Cellular Digital Packet Data ("CDPD"). The communications network 18 includes a Wireless Application Protocol ("WAP") or Digital Audio Broadcasting ("DAB"), 802.xx.xx, Global Positioning System ("GPS") and GPS map, Digital GPS ("DGPS") or other type of wireless network.

The wireless network includes, but is not limited to Code Division Multiple Access ("CDMA"), Time Division Multiple Access ("TDMA"), or other switched wireless technologies.

As is known in the art, PCS networks include network that cover a range of wireless, digital communications technologies and services, including cordless phones, mobile phones, voice mail, paging, faxing, mobile personal PDAs, etc. PCS devices are typically divided into narrowband and broadband categories.

Narrowband devices which operate in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

As is known in the art, GSM is another type of digital wireless technology widely used throughout Europe, in Australia, India, Africa, Asia, and the Middle East. GSM use is growing in the U.S. GSM is a wireless platform based on TDMA to digitize data. GSM includes not only telephony and Short Message Services ("SMS") but also voice mail, call forwarding, fax, caller ID, Internet access, and e-mail. As is known in the art, SMS is type of communications service that enables a user to allow private message communications with another user. GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

As is known in the art, GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

As is known in the art, CDPD is a wireless standard providing two-way, 19.2-Kbps or higher packet data transmission over existing cellular telephone channels. As is known in the art, a Packet Cellular Network ("PCN") includes various types of packetized cellular data.

The communications network 18 may also include a "mesh network" or a "mesh sensor network." A mesh network is a self-organizing networks built from plural nodes that may spontaneously create an impromptu network, assemble the network themselves, dynamically adapt to device failure and degradation, manage movement of nodes, and react to changes in task and network requirements. The plural nodes are reconfigurable smart sensor nodes that are self-aware, self-reconfigurable and autonomous.

A mesh network is a network that employs one of two connection arrangements, full mesh topology or partial mesh topology. In the full mesh topology, each node is connected directly to each of the others. In the partial mesh topology, nodes are connected to only some, not all, of the other nodes. A mesh network is a network where the nodes are in close proximity (e.g., about few feet to about 100 feet, or about 1 meter to about 30 meters, etc.).

Preferred embodiments of the present invention include network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, the ADSL Forum, the Federal Communications Commission (FCC), the 3rd Generation Partnership Project (3GPP), and 3GPP Project 2, (3GPP2) and Open Mobile Alliance (OMA). However, network devices based on other standards could also be used.

IEEE standards can be found on the World Wide Web at the Universal Resource Locator (URL) "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." The DOCSIS standard can be found at the URL "www.cablemodem.com." Bluetooth Forum documents can be found at the URL "www.bluetooth.com." WAP Forum documents can be found at the URL "www.wapforum.org." ADSL Forum documents can be found at the URL "www.adsl.com." FCC E911 can be found at the URL "www.fcc.gov/911/enhanced." 3GPP and 3GPP documents can be found at the URL "www.3gpp.org." The OMA documents can be found at the URL "www.openmobilealliance.org."

An operating environment for network devices and interfaces of the present invention include a processing system with one or more high speed Central Processing Unit(s) ("CPU") or other types of processors and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

As is known in the art, the Open Systems Interconnection ("OSI") reference model is a layered architecture that standardizes levels of service and types of interaction for network devices exchanging information through a communications network. The OSI reference model separates network device-to-network device communications into seven protocol layers, or levels, each building—and relying—upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

In one embodiment of the present invention, the wireless interfaces used for the plural target network devices 12, 14, 16 include but are not limited to, an IEEE 802.11a, 802.11b, 802.11g, 802.11n, "Wireless Fidelity" ("Wi-Fi"), "Worldwide Interoperability for Microwave Access" ("WiMAX"), ETSI High Performance Radio Metropolitan Area Network (HIPERMAN), "RF Home" Zigbee, Bluetooth, Infrared, Industrial, Scientific and Medical (ISM), a Radio Frequency Identifier (RFID) or other long range or short range wireless interfaces may be used to practice the invention.

As is known in the art, 802.11b defines a short-range wireless network interface. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is another type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL "www.weca.net."

As is known in the art, WiMAX is an industry trade organization formed by communications component and equipment companies to promote and certify compatibility and interoperability of broadband wireless access equipment that conforms to the IEEE 802.16xx and ETSI HIPERMAN. HIPERMAN is the European standard for MANs.

The IEEE The 802.16a, 802.16c, 802.16d 802.16e and 802.16g standards are wireless MAN technology standard that provides a wireless alternative to cable, DSL and T1/E1 for last mile broadband access. It is also used as complimentary technology to connect IEEE 802.11xx hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16d, 802.16e and 802.16g standards are incorporated herein by reference. More information on WiMAX can be found at the URL "www.wimaxforum.org." WiMAX can be used to provide a wireless local loop (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. More information on ETSI standards can be found at the URL "www.etsi.org."

As is known in the art, IEEE 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps, two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz ISM band (Worldwide), 10 channels in the 915 MHz (US) and one channel in the 868 MHz band (Europe). The IEEE 802.15.4-2003 standard is incorporated herein by reference. More information on 802.15.4 and ZigBee can be found at the URL "www.ieee802.org" and "www.zigbee.org" respectively.

As is known in the art, Bluetooth (IEEE 802.15.1a) is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. and the IEEE 802.15.1a standard are incorporated herein by reference.

As is known in the art, Infra data association (IrDA) is a short-range radio wireless Bluetooth or wireless infrared communications. As is known in the art, Industrial, Scientific and Medical (ISM) are short-range radio wireless communications interfaces operating at 400 MHz, 800 MHz, and 900 Mhz.

As is known in the art, an RFID is an automatic identification method, relying on storing and remotely retrieving data using devices called RFID tags or transponders. An RFID tag is a small object that can be attached to or incorporated into a product, animal, or person. RFID tags contain antennas to enable them to receive and respond to radio-frequency queries from an RFID transceiver. Passive tags require no internal power source, whereas active tags require a power source.

Passive tags are powered by received radiation from a reading device and require no internal source of power; thus, they can be manufactured at very low cost and require no ongoing maintenance as long as they are not removed or physically damaged. Passive tags can only be read by a reader device in close proximity to the tag, which is an advantage in RFID-based in-building location services.

RFID Passive tags can be manufactured in a sticker-like form factor and held in place by adhesive, providing very low installation cost; however, such an arrangement is not heat-resistant, and conventional mechanical mounting employing screws or cover plates is advisable for at least a minimal subset of all installed tags.

RFID Passive tags are typically capable of providing a 96-bit number to a tag reader: 96 bits allow $2^{96}=10^{29}$ (100 billion billion billion) possible codes, ample to allow unique identification of every significant location within a building.

RFID Active tags may also be employed for location awareness. Active tags have longer range and can include more sophisticated functionality. In the context of this invention, active tags may be programmed to validate their location from time to time, either by reference to Global Positioning System (GPS) signals using very long integration times, or by interrogation of other RFID tags in their vicinity.

A RFID tag which finds itself in an incorrect or unverified location is programmed to turn itself off, thus avoiding spurious location data being provided to a user; responses to incorrect location may also include emitting a distress signal which can be detected by a reader during building maintenance, or contacting a central location by direct wireless communications or mesh networking employing the multiplicity of companion ID tags, in order to induce maintenance personnel to diagnose and repair the problem with the subject tag.

RFID Active tags are also deployed in a mesh network that would allow information to pass from tag to tag. This type of network would allow tag and reader information to be passed from location to location and possibly from floor to floor to move the information to a central location or to the building wall ultimately making it easier to access. Active tag networks have significant functional advantages, but are relatively expensive and maintenance-intensive compared to passive tags.

The target network devices 12, 14, 16 include a protocol stack with multiple layers based on the Internet Protocol or OSI reference model. The protocol stack is used for, but not limited to, data networking. The protocol stack includes, but is not limited to, TCP, UDP, IP, Hypertext Transfer Protocol (HTTP), Simple Mail Transfer Protocol (SMTP), Post Office Protocol version 3 (POP3), Internet Mail Access Protocol (IMAP), Voice-Over-IP (VoIP), Session Initiation Protocol (SIP), Service Location Protocol (SLP), Session Description Protocol (SDP), Real-time Protocol (RTP), H.323, H.324, Domain Name System (DNS), Authentication Authorization and Accounting (AAA), instant-messaging (IM) and other protocols.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference. An IP address includes four sets of numbers divided by period (e.g., x.x.x.x) in the range of zero to 255. An IP address is a unique string of numbers that identifies a device on an IP based network.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

Media Access Control (MAC) is a data link layer protocol. A MAC address is a physical address of a device connected to a communications network, expressed as a 48-bit hexadecimal number. A MAC address is permanently assigned to each unit of most types of networking hardware, such as network interface cards (NICs) (e.g., Ethernet cards, etc.) by manufacturers at the factory.

VoIP is a set of facilities for managing the delivery of voice information using IP 28 packets. In general, VoIP is used to send voice information in digital form in discrete data packets (i.e., IP 28 packets) over data networks 18 rather than using traditional circuit-switched protocols used on the PSTN. VoIP is used on both wireless and wired data networks.

VoIP typically comprises several applications (e.g., SIP, SLP, SDP, H.323, H.324, DNS, AAA, etc.) that convert a voice signal into a stream of packets (e.g., IP 28 packets) on a packet network and back again. VoIP allows voice signals to travel over a stream of data packets over a communications network 18.

As is known in the art, SIP supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543 and IETF 3261, the contents of both of which are incorporated herein by reference.

As is known in the art, SLP provides a scalable framework for the discovery and selection of network services. Using SLP, network devices using the Internet need little or no static configuration of network services for network based applications. For more information on SLP see IETF RFC-2608, incorporated herein by reference.

As is known in the art, SDP is a protocol for describing multimedia sessions for the purposes of session announcement, session invitation, and other forms of multimedia session initiation. For more information on SDP, see IETF RFC-2327, incorporated herein by reference As is known in the art, RTP is a protocol for end-to-end network transport functions suitable for applications transmitting real-time data, such as audio, video or simulation data, over multicast or unicast network services. For more information on RTP, see IETF RFC-1889, incorporated herein by reference.

As is known in the art, H.323 is one of main family of video conferencing recommendations for IP networks. The ITU-T H.323 standards entitled "Packet-based multimedia communications systems" dated February, 1998, September, 1999, November, 2000 and July, 2003 are incorporated herein by reference.

As is known in the art, H.324 is a video conferencing recommendation using Plain Old Telephone Service (POTS) lines. The ITU-T H.324 standards entitled "Terminal for low bit-rate multimedia communication" dated February, 1998 and March, 2002 are incorporated herein by reference.

As is known in the art, a Domain Name System (DNS) provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated herein by reference.

As is known in the art, Authentication Authorization and Accounting (AAA) includes a classification scheme and exchange format for accounting data records (e.g., for call billing, etc.). For more information on AAA applications, see, IETF RFC-2924, the contents of which are incorporated herein by reference.

VoIP services typically need to be able to connect to traditional circuit-switched voice networks such as those provided by the PSTN. Thus, VoIP is typically used with the H.323 protocol and other multimedia protocols. H.323 and H.324 terminals such as multimedia computers, handheld devices, PDAs or other devices such as non-mobile and mobile phones connect to existing wired and wireless communications networks 18 as well as private wired and wireless networks.

H.323 and H.324 terminals implement voice transmission functions and typically include at least one voice codec (e.g., ITU-T CODECS, G.711, G.723, G.726, G.728, G.729, GSM, etc.) that sends and receives packetized voice data and typically at least one video codec (e.g., MPEG, etc.) that sends and receives packetized video data).

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon, Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

Security and Encryption

Devices and interfaces of the present invention may include security and encryption for secure communications. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the URL See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

Device Based Location

Figure 2:
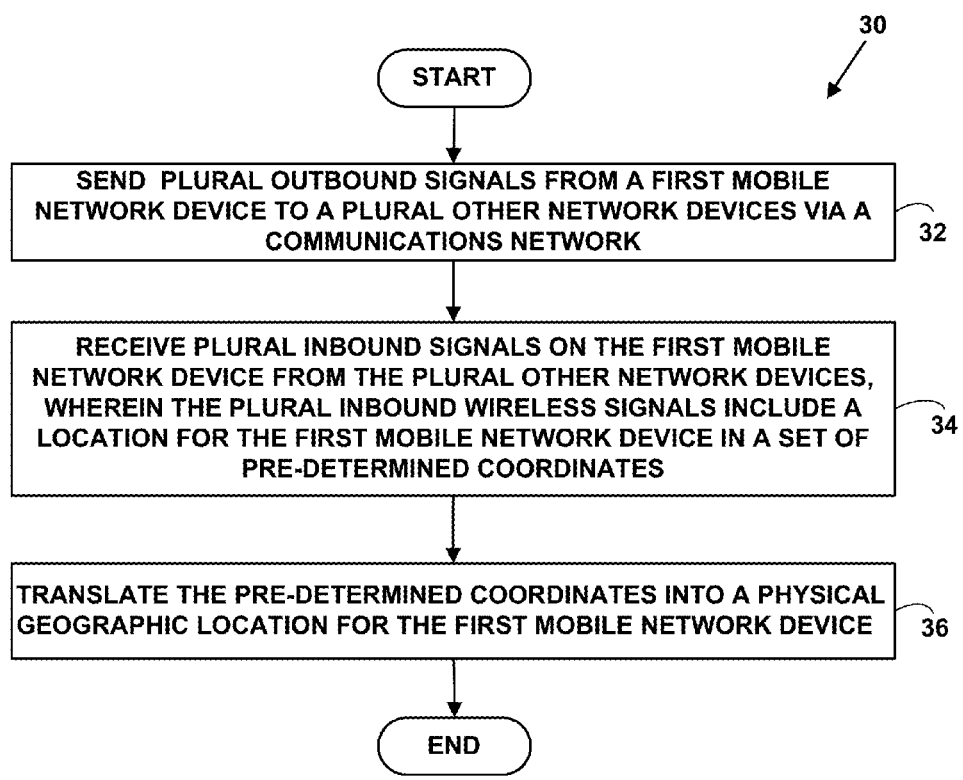
FIG. 2 is a flow diagram illustrating a method for locating a device.

FIG. 2 is a flow diagram illustrating a Method 30 for locating a device. At Step 32, plural outbound signals are sent from a first mobile network device to a plural other network devices via a communications network. At Step 34, the first mobile network device receives plural inbound wireless signals from the plural other network devices. The plural inbound wireless signals include a location for the first mobile network device in a set of pre-determined coordinates. At Step 36, the pre-determined coordinates are translated into a physical geographic location for the first mobile network device.

Method 30 is illustrated with one exemplary embodiment. However, the present invention is not limited to such an embodiment and other embodiments can also be used to practice the invention.

In such an exemplary embodiment at Step 32, plural outbound signals are sent from a first mobile network device 12, 14, 16 to a plural other network devices 20, 22, 24 via a communications network 18. In one embodiment, the plural outbound signals are plural outbound wireless signals. In one embodiment the plural outbound signals include SIP messages with geo-location headers and/or message bodies which may include SDP messages.

At Step 34, the first mobile network device 12, 14, 16 receives plural inbound wireless signals from the plurality of other network devices 20, 22, 24. In one embodiment the plural inbound wireless signals include SIP or SDP protocol messages with a geo-location information.

The plural inbound wireless signals include a location for the first mobile network device 12, 14, 16 in a set of pre-determined coordinates. In one embodiment, the set of pre-determined coordinates are (X,Y,Z) space coordinates, which are also called "geo-coordinates."

At Step 36, the pre-determined coordinates are translated into a physical geographic location for the first mobile network device including, but not limited to, a room on a building floor, a building floor in a building, a building on a street, enterprise, campus, village, town, city, state, country or continent or other global region, etc. As described herein, the physical geographic address is not a physical or data link layer address, but instead a location-based address.

In one embodiment, the location information is constantly updated in real-time (e.g., milliseconds, seconds, etc.) In another embodiment, the location information is updated in non-real-time time frames (e.g., hours, days, etc.). If the first mobile network device moves, a notification is sent to the other network devices 20, 22, 24 via the communications network.

Thus, the target device 12, 14, 16 always knows it's geo-location. If the target device 12, 14, 16 is a dumb device, a location server 20, 22, 24 acts a proxy for the dumb device and the location server, 22, 22, 24 always know the geo-location of the dumb device even though the dumb device may not know its own location.

In one embodiment, the first mobile network device 12, 14 includes application 26 as software on a Universal Serial Bus (USB) device that is plugged into the device. In one embodiment, the USB device includes a wireless radio transceiver chip. In another embodiment, the first mobile network device 12, 14 may already include a wireless radio transceiver. In such an embodiment, the USB device may only include application 26.

In one embodiment, The USB port provides the power to the transceiver chip. The transceiver chip uses low power "heartbeat" communications with wireless transceivers that are strategic located throughout an enterprise, building, campus, village, town, city, state, country or continent or other global region. Software application 26 in the USB device processes the return signals from the other wireless transceivers in such way as to determine the location of the first mobile network device 12, 14 in geo-space.

Emergency Device Based Location

Figure 3:
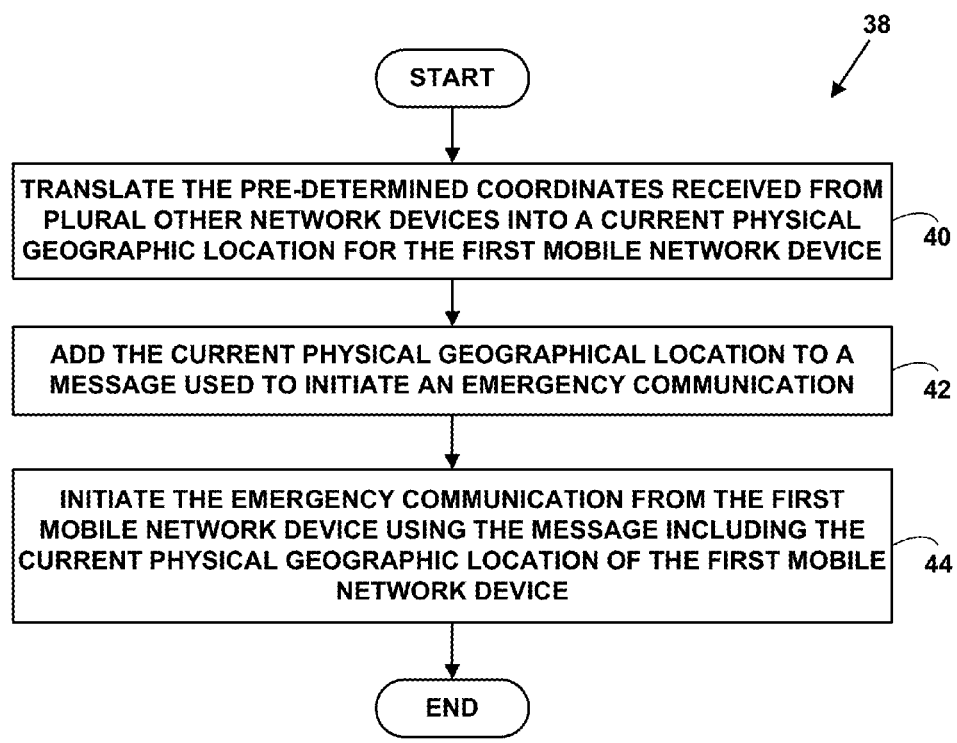
FIG. 3 is a flow diagram illustrating a method for locating a device in an emergency.

FIG. 3 is a flow diagram illustrating a Method 38 for locating a device in an emergency. At Step 40, a set of pre-determined coordinates received from plural other network devices are translated into a current physical geographic location for a first mobile network device. At Step 42, the physical geographical location is added to a message used to initiate an emergency communication. At Step 44, the emergency communication is initiated from the first mobile network device using the message including the physical geographic location of the first mobile network device.

Method 38 is illustrated with one exemplary embodiment. However, the present invention is not limited to such an embodiment and other embodiments can also be used to practice the invention.

In such an exemplary embodiment at Step 40, a set of coordinates in geo-space received from plural other network devices 20, 22, 24 are translated into a current physical geographic location for a first mobile network device, 12, 14 16.

In one embodiment, the current physical geographic location for the first mobile network device 12, 14, 16, includes, but not limited to, a room on a building floor, a building floor in a building, a building on a street, enterprise, campus, village, town, city, state, country or continent or other global region, etc.

At Step 42, the current physical geographical location is added to a SIP geo-location header and/or message body used to initiate an E911 emergency communication.

As is known in the art, E911 stands for "Enhanced 911" which is an emergency event that provides a data event (i.e., including location information) along with the voice event (i.e., an emergency voice call).

At Step 44, the E911 emergency communication is initiated from the first mobile network device 12, 14, 16 using the SIP geo-location header and/or message body including the physical geographic location of the first mobile network device 12, 14, 16.

Figure 4:
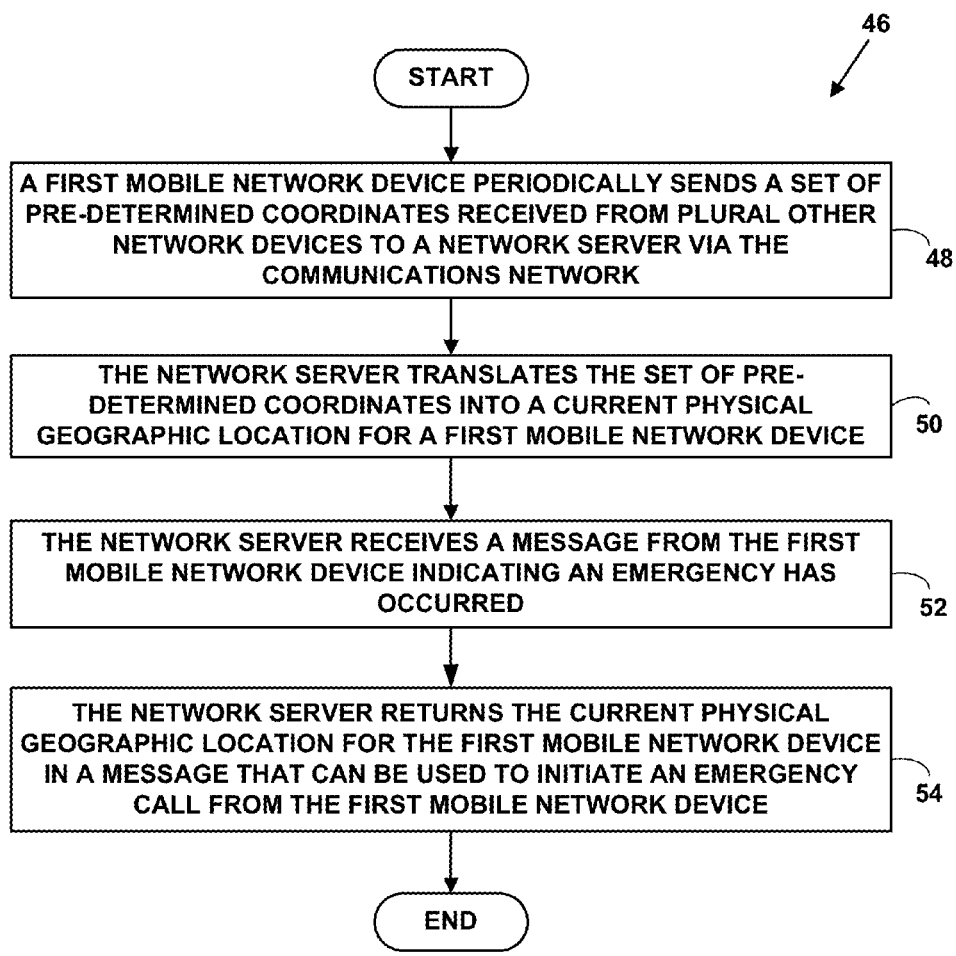
FIG. 4 is a flow diagram illustrating a method for locating a device.

FIG. 4 is a flow diagram illustrating a Method 46 for locating a device. At Step 48, a first mobile network device periodically sends a set of pre-determined coordinates received from plural other network devices to a network server via a communications network. At Step 50, the network server translates the set of pre-determined coordinates into a current physical geographic location for a first mobile network device. At Step 52, the network server receives an emergency message from the first mobile network device indicating an emergency has occurred. At Step 54, the network server returns the current physical geographic location for the first mobile network device in a message.

Method 46 is illustrated with one exemplary embodiment. However, the present invention is not limited to such an embodiment and other embodiments can also be used to practice the invention.

In such an exemplary embodiment at Step 48, a first mobile network device 12, 14, 16 periodically sends a set of coordinates geo-space received from plural other network devices 20, 22 to a network server 24 via the communications network 18.

For example, the first mobile network device 12, 14, 16 periodically updates, either on a scheduled basis or on an event basis (e.g., physical movement of the device) its r geo-coordinates to a centralized location tracing management system 24 using HTTP, IP, cellular, RFID, 802.xx.xx, or other wireless or other data transmission protocols.

At Step 50, the network server 24 translates the set of geo-space coordinates into a current physical geographic location for a first mobile network device 12, 14, 16.

The centralized management tracing system 24 translates the geo-space coordinates into a current physical geographic location that can be responded to by emergency responders such a police, fire, military, etc. The centralized management tracing system 24 also provides access to current physical geographic location information via the communications network 18 with a web-interface or other interface useable by emergency personnel.

At Step 52, the network server 24 receives an emergency message from the first mobile network device 12, 14, 16 indicating an emergency event has occurred.

In one embodiment, at Step 54, the network server 24 returns the current physical geographic location for the first mobile network device 12, 14, 16 in a SIP geo-location header and/or message body that can be used to initiate an E911 emergency call from the first mobile network device 12, 14, 16.

In another embodiment, upon an emergency call, the centralized management tracing system 24 provides the current physical geographic location of the first network device 12, 14, 16 back to the first mobile network device in a message other than a SIP geolocation header and/or message body (e.g., IP, IM, cellular, 802.xx.xx, RFID, etc.).

In another embodiment, the centralized management tracing system 24 also provides the current physical geographic location of the first mobile network device 12, 14, 16 to emergency personnel using a variety of methods including, but not limited to those illustrated in Table 1.

TABLE 1

| | |
|---|---|
| a. | Providing a SIP messages to initiate an E911 communications to communications network 18 for the first mobile network device 12, 14, 16, that describes the physical location of the first mobile network device 12, 14, 16; or |
| b. | Updating tables in call servers and network edge devices on the communications network 18 used by the E911 system to process an E911 communications from a mobile network device to allow the first mobile network device 12, 14, 16, to be located when it initiates an E911 communications. |

Locating a Device Using Existing Wireless Networks

Figure 5:
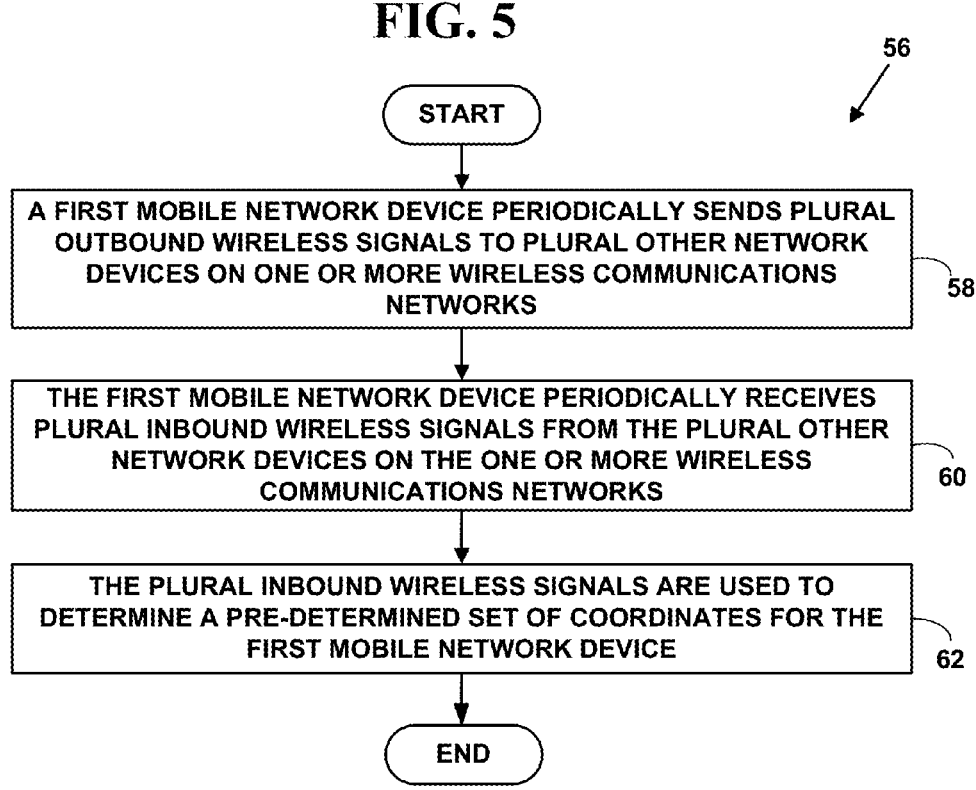
FIG. 5 is a flow diagram illustrating a method for locating a device using existing wireless networks.

FIG. 5 is a flow diagram illustrating a Method 56 for locating a device using existing wireless networks. At Strep 58, a first mobile network device periodically sends plural outbound wireless signals to plural other network devices on one or more wireless communications networks. At Step 60, the first mobile network device periodically receives plural inbound wireless signals from the plural other network devices on the one or more wireless communications networks. At Step 62, the plural inbound wireless signals are used to determine a pre-determined set of coordinates for the first mobile network device.

Method 56 is illustrated with one exemplary embodiment. However, the present invention is not limited to such an embodiment and other embodiments can also be used to practice the invention.

In such an exemplary embodiment at Step 58, a first mobile network device 12, 14, 16 periodically sends plural outbound wireless signals to plural other network devices 20, 22, 24 on one or more wireless communications networks 18.

At Step 60, the first mobile network device 12, 14, 16 periodically receives plural inbound wireless signals from the plural other network devices 20, 22, 24 on the one or more wireless communications networks 18.

At Step 62, the plural inbound wireless signals are used to determine a set of coordinates in geo-space for the first mobile network device 12, 14, 16.

In one embodiment, a transceiver chip in the first mobile network device 12, 14, 16, is used to poll existing WiFi, WiMax, 802.xx.xx, cellular, RFID, mesh and other wireless networks to determine its geo-space. The application 26 uses a variety of methods to determine location in geo-space including triangulation, signal strength, orthogonal, etc. The location is constantly updated and the first mobile network device 12, 14, 16 always knows its geo-location.

In one embodiment, the plural inbound wireless signals are used for Peer-to-Peer location determination of other network devices on the communications network.

Figure 6:
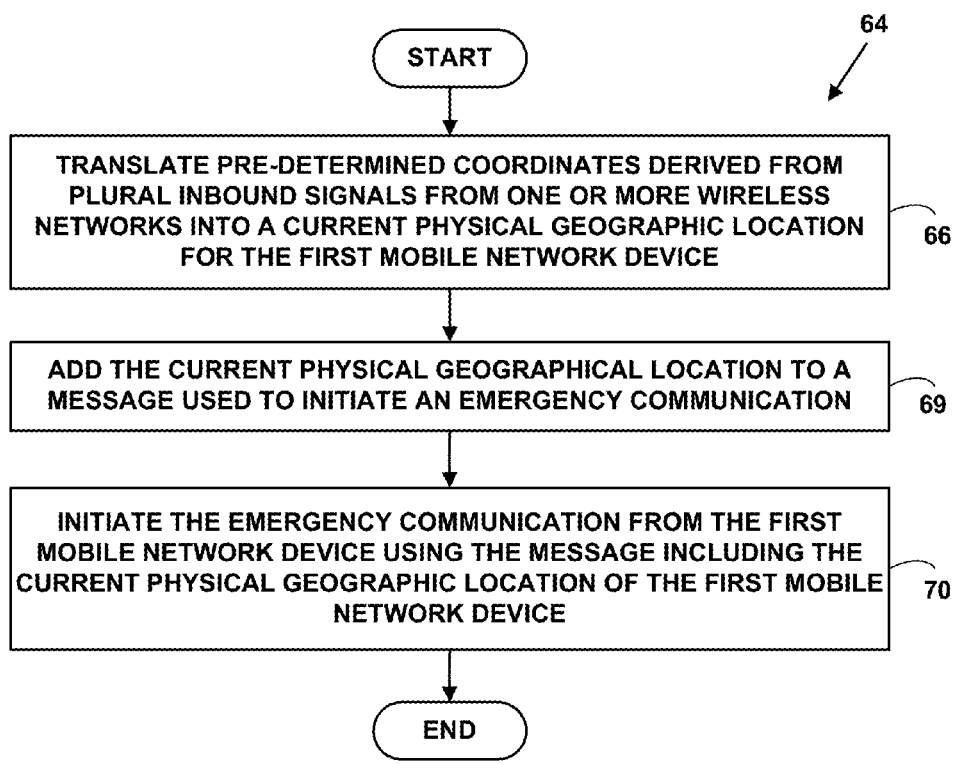
FIG. 6 is a flow diagram illustrating a method for locating a device in an emergency.

FIG. 6 is a flow diagram illustrating a Method 64 for locating a device in an emergency. At Step 66, a set of pre-determined coordinates determined from plural received inbound wireless signals are translated into a current physical geographic location for a first mobile network device. At Step 68, the physical geographical location is added to a message used to initiate an emergency communication. At Step 70, the emergency communication is initiated from the first mobile network device using the message including the physical geographic location of the first mobile network device.

Method 64 is illustrated with one exemplary embodiment. However, the present invention is not limited to such an embodiment and other embodiments can also be used to practice the invention.

In such an exemplary embodiment at Step 66 a set of coordinates in geo-space is determined from plural received inbound wireless signals are translated into a current physical geographic location for a first mobile network device 12, 14, 16.

At Step 68, the physical geographical location is added to a SIP geolocation header and/or message body used to initiate an emergency E911 communication.

At Step 70, the E911 emergency communication is initiated from the first mobile network device 12, 14, 16 using the SIP geo-location header and/or message body including the physical geographic location of the first mobile network device 12, 14, 16.

Figure 7:
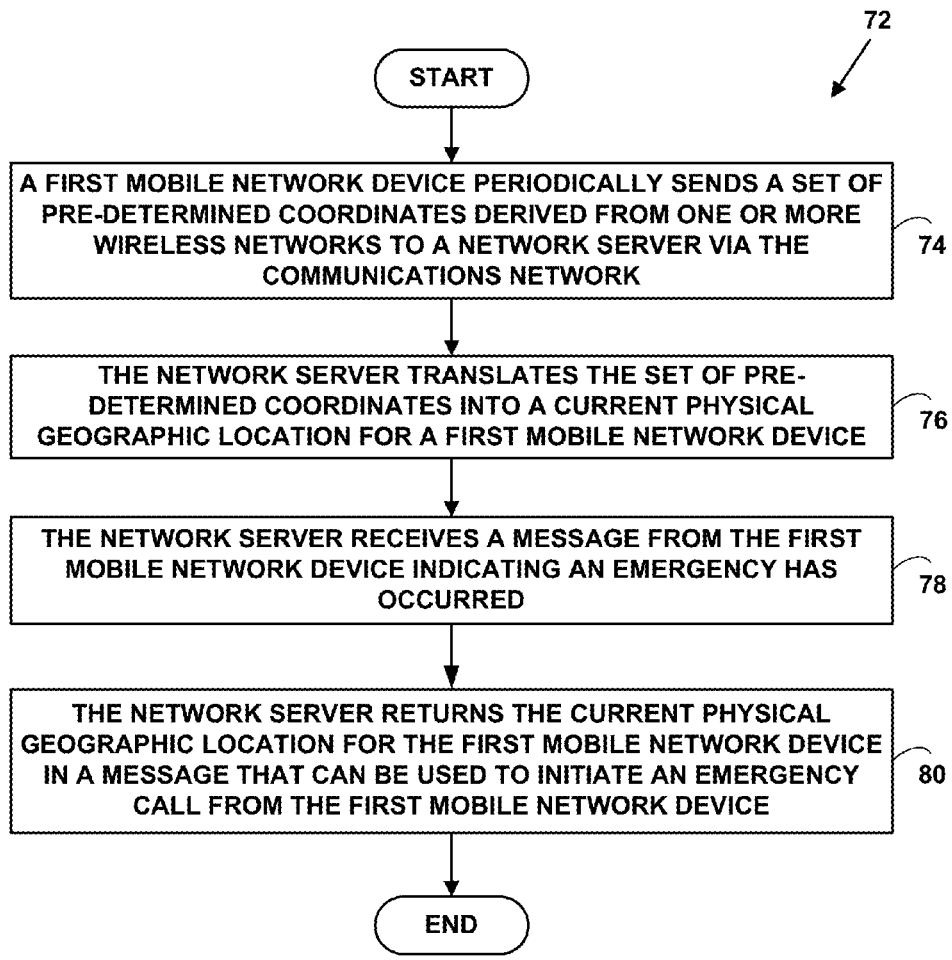
FIG. 7 is a flow diagram illustrating a method for locating a device in an emergency.

FIG. 7 is a flow diagram illustrating a Method 72 for locating a device in a emergency. At Step 74, a first mobile network device periodically sends a set of pre-determined coordinates derived from one or more other wireless networks to a network server via a communications network. At Step 76, the network server translates the set of pre-determined coordinates into a current physical geographic location for a first mobile network device. At Step 78, the network server receives an emergency message from the first mobile network device indicating an emergency has occurred. At Step 80, the network server returns the current physical geographic location for the first mobile network device in a message.

Method 72 is illustrated with one exemplary embodiment. However, the present invention is not limited to such an embodiment and other embodiments can also be used to practice the invention.

In such an exemplary embodiment at Step 74, a first mobile network device 12, 14, 16 periodically sends a set of coordinates in geo-space derived from one or more other wireless communications networks 18.

For example, the first mobile network device 12, 14, 16 periodically updates, either on a scheduled basis or on an event basis (e.g., physical movement of the device) its geo-coordinates to a centralized location tracing management system 24 using HTTP, IP, SIP, SDP, or other wireless or other data transmission protocols.

At Step 76, the network server 24 translates the set of geo-space coordinates into a current physical geographic location for a first mobile network device 12, 14, 16.

The centralized management tracing system 24 translates the X, Y and Z coordinates into a current physical geographic location that can be responded to by emergency responders such a police, fire, military, etc. The centralized management tracing system 24 also provides access to current physical geographic location information via the communications network 18 with a web-interface or other interface useable by emergency personnel.

At Step 78, the network server 24 receives an emergency message from the first mobile network device 12, 14, 16 indicating an emergency has occurred.

In one embodiment, at Step 80, the network server 24 returns the current physical geographic location for the first mobile network device 12, 14, 16 in a SIP geo-location header and/or message body that can be used to initiate an E911 emergency call from the first mobile network device 12, 14, 16.

In another embodiment, upon an emergency call, the centralized management tracing system 24 provides the current physical geographic location of the first network device 12, 14, 16 back to the first mobile network device in a message other than a SIP message (e.g., IP, etc.).

In another embodiment, the centralized management tracing system 24 also provides the current physical geographic location of the first mobile network device 12, 14, 16 to emergency personnel using a variety of methods including, but not limited to those illustrated in Table 2.

TABLE 2 a. Providing a SIP geo-location header and/or message bodies to initiate an E911 communications to communications network 18 for the first mobile network device 12, 14, 16, that describes the physical location of the first mobile network device 12, 14, 16; or
b. Updating tables in call servers and network edge devices on the communications network 18 used by the E911 system to process an E911 communications from a mobile network device to allow the first mobile network device 12, 14, 16, to be located when it initiates an E911 communications.

Emergency Location Information Service (E-LIS)

Figure 8:
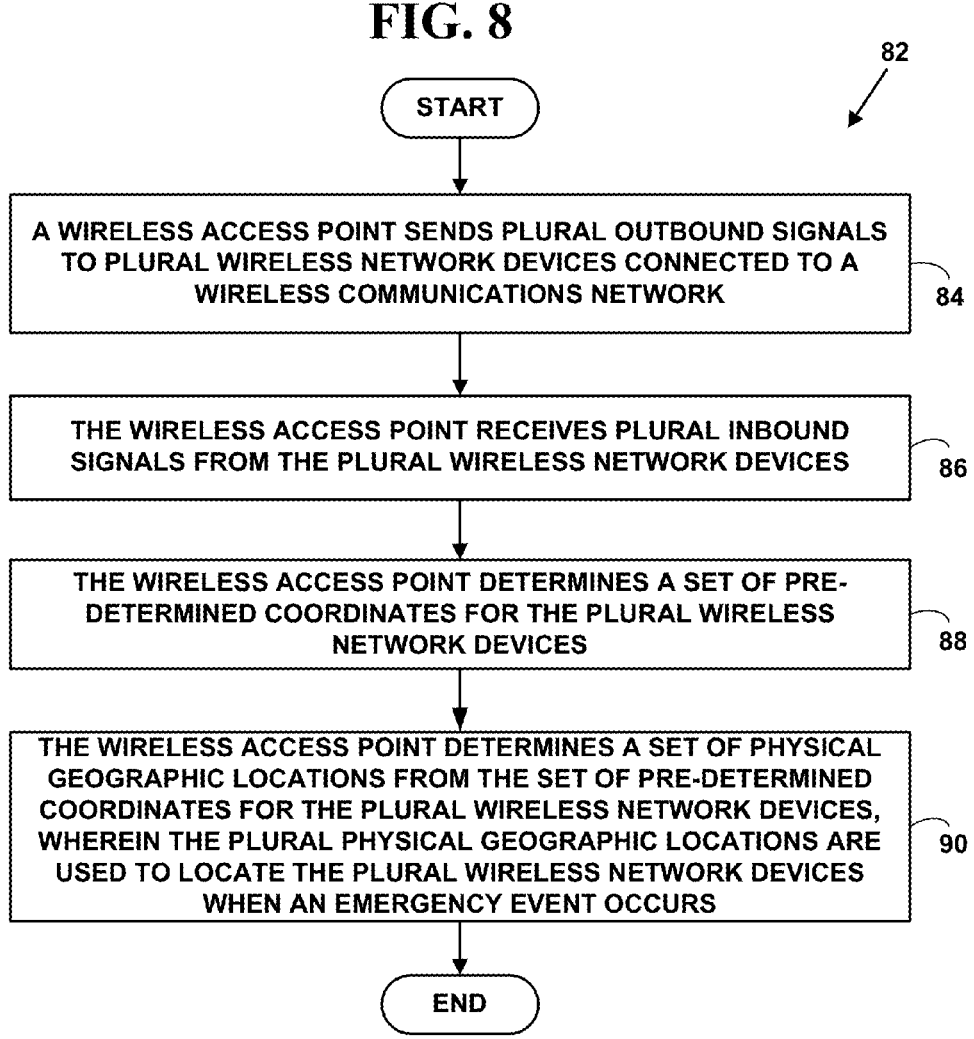
FIG. 8 is a flow diagram illustrating a method for locating a device using existing wireless networks.

FIG. 8 is a flow diagram illustrating a Method 82 for locating a device using existing wireless networks. At Step 84, a wireless access point sends plural outbound signals to plural wireless network devices connected to a wireless communications network. At Step 86, the wireless access point receives plural inbound signals from the plural wireless network devices. At Step 88, the wireless access point determines a set of pre-determined coordinates for the plural wireless network devices. At Step 90, the wireless access point determines a set of physical geographic locations using the determined set of pre-determined coordinates for the plural wireless network devices. The plural physical locations are used to locate the plural wireless network devices when an emergency event occurs.

In one embodiment, Method 82 further includes Step 91. At Step 91, the wireless access point sends the set plural physical locations for the plural network networks to a server device to allow a physical geographic location to be determined for the plural network devices. However, Method 82 can be practice with or without Step 91.

Method 82 is illustrated with one exemplary embodiment. However, the present invention is not limited to such an embodiment and other embodiments can also be used to practice the invention.

In such an exemplary embodiment at Step 84, a wireless access point 24 sends plural outbound signals to plural wireless network devices 12, 14, 16 connected to a wireless communications network 18.

In one embodiment the plural outbound signals include plural SIP geo-location header and/or message bodies or other protocol messages.

In one embodiment the wireless access point 24 includes a server device. In another embodiment, the wireless access point 24 does not include a server device. In such an embodiment the wireless access point 24 comprises a proxy for dumb devices.

In one embodiment, the plural wireless network devices 12, 14, 16 include unique identifiers. (e.g., IP and MAC address, MAC address, URI, etc.). At Step 86, the wireless access points sends out the plural outbound signals to "ping" the plural network devices device and then measures a return signal strength, a return time delay, a return orthogonal to determine the geo-coordinates of the plural wire network devices. In such an embodiment, the plural wireless network devices periodically send out an electronic heartbeat with a timestamp to the wireless access point via the communications network 18. However, the present invention is not limited to this embodiment and other embodiments can also be used to practice the invention.

At Step 86, the wireless access point 24 receives plural inbound signals from the plural wireless network devices 12, 14, 16.

In one embodiment, the plural inbound signals and plural outbound signals include, but are not limited to, SIP, SDP, IP, MAC, CMRS, cellular telephone, PCS, PCN, GSM, GPRS, CDPD, WAP DAB, Wi-Fi, WiMAX, IEEE 802.11xx, GPS, GPS map, DGPS, IM, SMS, RFID or Zigbee signals. However, the present invention is not limited to this embodiment and other inbound and outbound signals can be used to practice the invention.

However, the present invention is not limited to this embodiment and other inbound and outbound signals can be used to practice the invention.

In one embodiment at Step 90, the wireless access point 24 determines a set of geo-coordinates and an identifier including an IP address and a MAC address for the plural wireless network devices 12, 14, 16.

In another embodiment, at Step 90, the wireless access point 24 determines a set of geo-coordinates using a unique identifier pre-assigned to the plural wireless network devices 12, 14, 16. This unique identifier does not include an IP address or a MAC address. In one embodiment the unique identifier is included in an E-Location Object.

In one embodiment, the E-Location Object includes an Extensible Markup Language (XML) object extension to a Presence Information Data Format (e.g., PIDF-LO) as defined in RFC-4119, the information used in current presence-based systems, like IM (or SMS). For more information see IETF RFC-4119, incorporated herein by reference.

In another embodiment, the unique identifier includes a Uniform Resource Identifier (URI). As is known in the art, a URI is a unique address of a network resource that is unique across the whole network it is used on. A URI is the unique identifier used to access the resource on a network.

In another embodiment, the unique identifier includes a specialized E911-based unique identifier. However, the present invention is not limited to these unique identifier and other identifiers can also be used to practice the invention.

At Step 90, the wireless access point 24 determines a set of physical geographic locations for the plural wireless network devices 12, 14, 16. The plural physical geographic locations are used to locate the plural wireless network devices when an emergency event occurs, such as an E911 call. In another embodiment, the plural physical geographic locations are used to locate the plural wireless network devices 12, 14, 16 during non-emergency situations.

In one embodiment, at Step 91, the wireless access point 20 sends a set of geo-coordinates and an identifier including an IP address and a MAC address for the plural network devices 12, 14, 16 to a server device 24 to allow a physical geographic location to be determined for the plural network devices 12, 14, 16 on the server device 24.

In another embodiment at Step 91, the wireless access point 20 sends the unique identifier for the plural network devices 12, 14, 16 to a server device 24 to allow a physical geographic location to be determined for the plural network devices 12, 14, 16 on the server device 24.

In such embodiments, both the wireless access point 20 and the server device 24 have physical geographic location of the plural network devices 12, 14, 16.

In another embodiment, Method 82 is practiced with wired devices, a wired access point and a wired communications network 18. In another embodiment, Method 82 is practiced with a combination of wireless and wired devices and wired and wireless communications networks.

In another embodiment, a geo-coordinates in (X, Y and/or Z) space is used in place of the physical geographic location. In such an embodiment, the geo-coordinates may be further translated or used by other devices to determine a device location.

Figure 9:
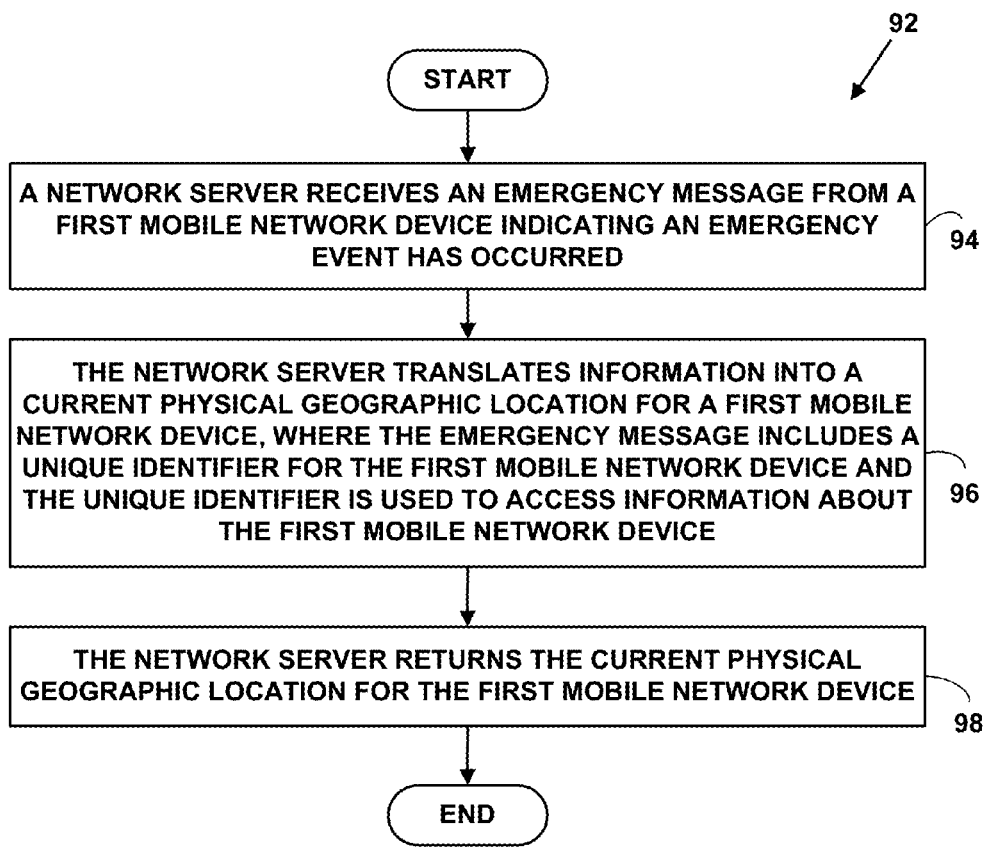
FIG. 9 is a flow diagram illustrating a method for locating a device in an emergency.

FIG. 9 is a flow diagram illustrating a Method 92 for locating a device in an emergency. At Step 94, a network server receives an emergency message from a first mobile network device via a communications network indicating an emergency event has occurred. At Step 96, the network server information translates information from the emergency message into a current physical geographic location for a first mobile network device. The emergency message includes a unique identifier for the first mobile network device and the unique identifier is used to access information about the first mobile network device. At Step 98, the network server returns the current physical geographic location for the first mobile network device in a signal via the communications network.

Method 92 is illustrated with one exemplary embodiment. However, the present invention is not limited to such an embodiment and other embodiments can also be used to practice the invention.

In such an exemplary embodiment at Step 94, a network server 24 receives an emergency message from a first mobile network device (e.g., 12) via the communications network 18 indicating an emergency event (e.g., fire, accident, injury, criminal event, etc.) has occurred.

In one embodiment, the emergency message is an E911 communication event. In another embodiment, the emergency message is an non-emergency message.

In one embodiment the emergency message includes a SIP geo-location header and/or message body with a geo-location header. The geo-location header includes a PIDF-LO extension (i.e., RFC-4119) for the device. When a PIDF-LO is present, the header will indicate to SIP proxies along the call path where in the message body the PIDF-LO can be found, otherwise the geo-location header will have the SIP URI (i.e., address) of the E-LIS where the device's location is stored.

In another embodiment, the emergency message includes a SIP geo-location header and/or message body without a PIDF-LO extension. In another embodiment, the emergency message includes an E911 message.

At Step 96, the network server 24 translates information from the emergency message into a current physical geographic location for a first mobile network device 12.

In one embodiment, the network server 24 translates a set of coordinates in geo-space in the emergency message or retrieves from database 24' a set of previously stored coordinates for the first mobile network device 12 and the unique identifier includes an IP address and MAC address into a current physical geographic location for the first mobile network device 12, and writes this information back to the first mobile network device 12 in a management data message or management data stream over the wireless communications network 18.

In another embodiment, the network server 24 translates the unique identifier for the first mobile network device 12 into a current physical geographic location for the first mobile network device 12. The unique identifier includes a URI for the first mobile network device 12.

In another embodiment, the network server 24 translates a unique identifier for the first mobile network device 12 into a current physical geographic location for the first mobile network device 12 and the unique identifier is used for a look-up of a ten digit emergency location identification number (ELIN) number that will be sent out in the event of a E911 call for the first mobile network device 12.

In another embodiment, the network server 24 translates a set of coordinates in geo-space in the emergency message or retrieves from database 24' a set of previously stored current physical geographical location for the first mobile network device 12 and writes this information back to the first mobile network device 12 in a management data stream over the wireless communications network 18.

In another embodiment, the first mobile network device is a first non-mobile network device.

In one embodiment, the emergency message is an emergency message sent over a wireless interface. In one embodiment, the wireless interfaces include, but are not limited to, CMRS, cellular telephone, PCS, PCN, GSM, GPRS, CDPD, WAP DAB, Wi-Fi, WiMAX, IEEE 802.11xx, GPS, GPS map, DGPS, IM, SMS, RFID or Zigbee wireless interfaces. However, the present invention is not limited to this embodiment and other wireless interfaces can be used to practice the invention.

In another embodiment, the emergency message is an emergency message sent over a wired interface. In another embodiment, the emergency message is an non-emergency message.

Figure 10:
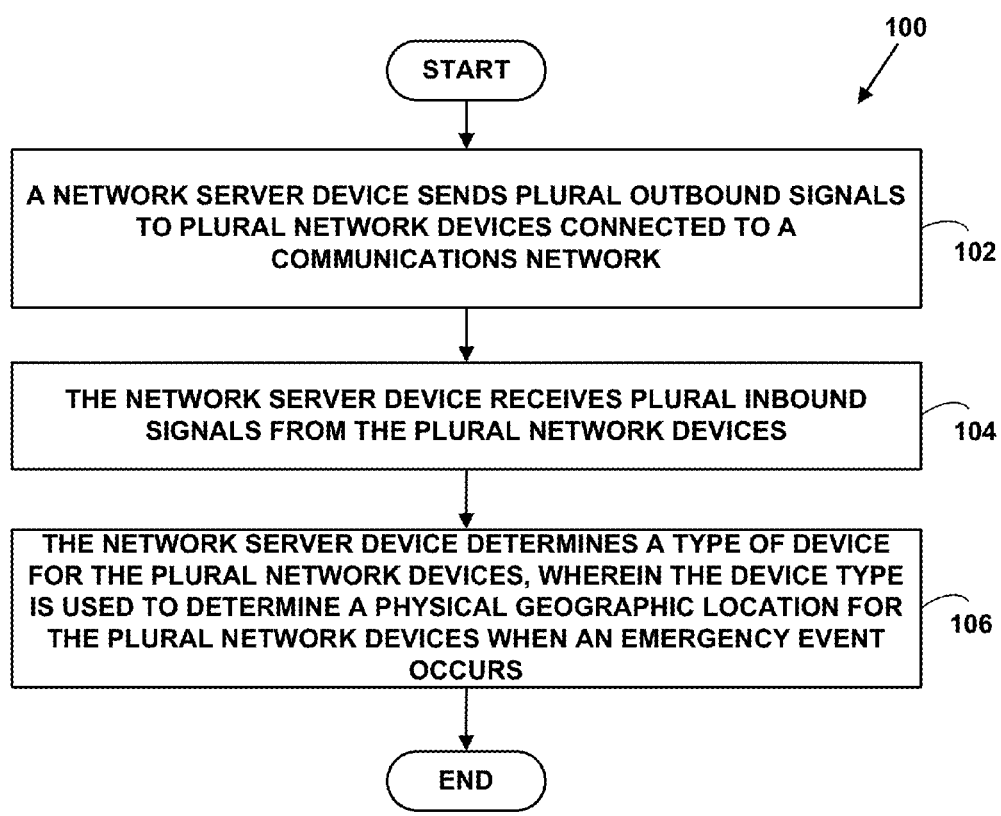
FIG. 10 is a flow diagram illustrating a method for an emergency location information service (E-LIS)

FIG. 10 is a flow diagram illustrating a Method 100 for an emergency location information service (E-LIS). At Step 102, a network server device sends plural outbound signals to plural network devices connected to a communications network. At Step 104, the network server device receives plural inbound signals from the plural network devices. At Step 106, the network server device determines a type of device for the plural network devices. The type of device is used to determine a physical geographic location for the plural network devices when an emergency event occurs.

Method 100 is illustrated with one exemplary embodiment. However, the present invention is not limited to such an embodiment and other embodiments can also be used to practice the invention.

In one embodiment, the plural inbound and outbound signals include, but are not limited to, SIP geo-location header and/or message bodies.

In one embodiment the plural outbound and plural inbound signals are sent securely to and received securely from the communications network 18.

In one embodiment, plural inbound and outbound signals comprise wireless signals include, but are not limited to, CMRS, cellular telephone, PCS, PCN, GSM, GPRS, CDPD, WAP, DAB, Wi-Fi, WiMAX, IEEE 802.11xx, GPS, GPS map, DGPS, IM, SMS, RFID or Zigbee wireless signals.

In one embodiment, the plural inbound and outbound signals comprise wired signals include, but are not limited to, CATV, HDTV, DSL, ADSL, VDSL, etc., coaxial or fiber optic signals.

In such an exemplary embodiment, at Step 102 a network server device 24 sends plural outbound signals to plural wired or wireless target network devices 12, 14, 16 connected to a wired or wireless communications network 18.

At Step 104, the network server device 24 receives plural inbound signals from the plural target network devices 12, 14, 16.

In one embodiment at Step 106, the network server device 24 determines a device type for the plural wireless or wired target network devices 12, 14, 16 to allow a current physical geographic location to be determined for the plural wireless or wired target network devices 12, 14, 16 in an emergency event situation.

In one embodiment, at Step 106, the network server device 24 determines a device type using at least the items illustrated in Table 3.

TABLE 3

| | |
|---|---|
| a. | a location determination of IP and SIP softphone client devices external to an enterprise network. |
| b. | a location determination of IP and SIP devices within an enterprise data network. |
| c. | a location determination of IP and SIP devices on WiFi, WiMAX other 802.xx.xx networks. |
| d. | a location determination for IP and SIP devices using location positioning chipsets (GPS, etc.). |
| e. | a location determination for geo-coordinate devices on wireless networks |
| f. | a location determination for geo-coordinate devices on wired networks |

In on embodiment, the device type includes a smart network device that stores its own location information or a dumb target network device that does not store its own location information. If the device type is a dumb target network device, then the server network device includes a proxy server device to store location information for the dumb target network device.

In one embodiment, the emergency event is an E911 communication event. In another embodiment, the emergency message is an non-emergency event.

Figure 11:
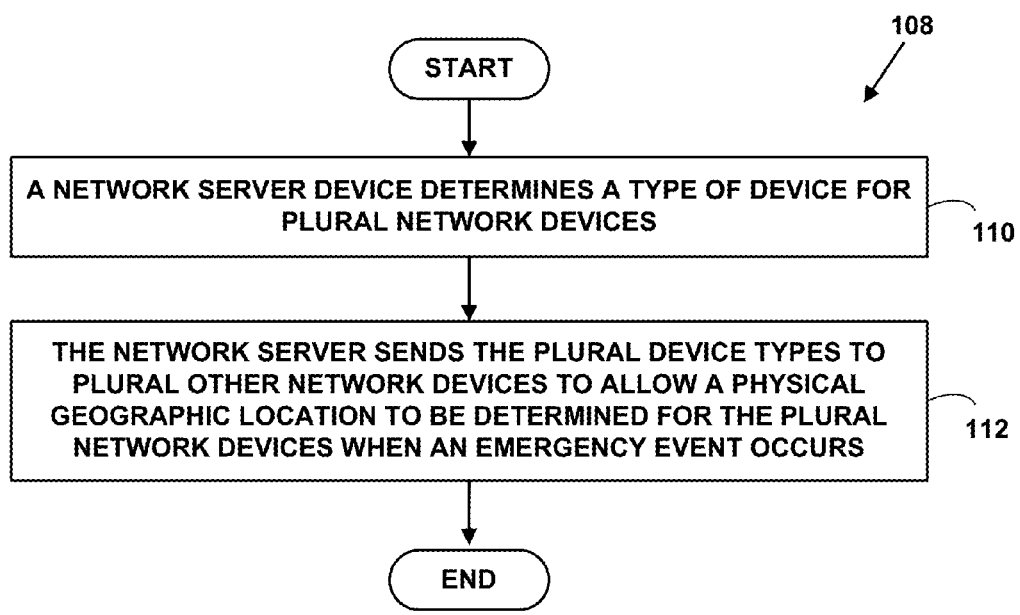
FIG. 11 is a flow diagram illustrating a method for an emergency location information system (E-LIS)

FIG. 11 is a flow diagram illustrating a Method 108 for a location information system. At Step 110, a network server device determines a type of device for the plural target network devices. At Step 112, the network server device sends the plural device types to plural other server network devices to allow a physical geographic location to be determined for the plural target network devices when an emergency event occurs.

Method 108 is illustrated with one exemplary embodiment. However, the present invention is not limited to such an embodiment and other embodiments can also be used to practice the invention.

In such an exemplary embodiment, at Step 110, the network server device 24 determines IP based network devices and SIP based network devices for the plural wireless or wired target network devices 12, 14, 16 to allow a current physical geographic location to be determined for the plural wireless or wired target network devices 12, 14, 16 in an emergency situation. However, the present invention is not limited to IP and SIP based network devices and the network server device 24 can be used to determine other types of target network devices.

At Step 112, the network server device 24 sends the plural device types to plural other server network devices 20, 22 to allow a physical geographic location to be determined for the plural target network devices 12, 14, 16 when an emergency event occurs. In one embodiment, the emergency event is a E911 communication event.

In another embodiment, the network server device 24 sends the plural device types to plural other server network devices 20, 22 to allow a physical geographic location to be determined for the plural target network devices 12, 14, 16 when non-emergency event occurs.

In one embodiment, at Step 112, the network server device 24 sends physical geographic location data to ancillary network infrastructure devices that may store, manage or forward physical location data including, but not limited to those listed in Table 4.

TABLE 4

| | |
|---|---|
| a. | IP Private Branch Exchanges (PBXs) |
| b. | SIP servers and SIP call servers |
| c. | Session Border Controllers |
| d. | Wireless Access Points (WiAPs) |
| e. | Wireless LAN switches |
| f. | Wireless network management software and systems |
| g. | LAN switches |
| h. | Routers and Bridges |
| i. | Dynamic Host Configuration Protocol (DHCP) servers |
| j. | Other network applications that consolidate location data for devices |
| k. | Mobile Positing Centers |
| l. | Gateway Mobile Location Centers |

The server network device 24 also includes an application 26 with software to convert geo-coded location data to physical location or physical maps.

The server network device 24 also includes an application 26 for reading and writing data to external databases, applications, systems including, but not limited to, those illustrated in Table 5.

TABLE 5

| | |
|---|---|
| a. | Automatic Location Identification (ALI) Databases that are hosted by Regional Bell Operating Companies, ILECs, CLECs |
| b. | VoIP Positioning Centers |
| c. | Mobile Positioning Centers |
| d. | Gateway Mobile Location Centers |
| e. | Selective router networks |
| f. | Master Street Address Guide (MSAG) validation systems |
| g. | Other databases |
| h. | Provisioning databases and provisioning applications |

TABLE 5-continued i. Billing Systems, applications and databases
j. Corporate database
k. Caller ID databases
l. E911 databases In one embodiment, the server network device 24 also includes an application 26 for notification of events, scheduling of tasks, issuing reports on system logs and system performance and activity and a graphical user interface (GUIs) for softphone and device location identification by the end user.

The methods and system described herein provide, but are not limited to at least: (1) location determine services for any network device in any access network (e.g., Ethernet, cable, DSL, WiFi, WiMAX, cellular, CATV, PSTN, RFID, mesh, 802.xx.xx, etc.); (2) Determines a physical geographical location if necessary, and interface with any and all existing location systems (e.g., GPS, network triangulation, other WiFi, WiMAX and other wireless tracking systems, etc.), and stores, manipulates, secures, and "serves up" location, in a data form or XML data objects (or other accepted and necessary data formats), to devices capable of accepting it, to location recipients, where the service/servers stores location on behalf of users/devices; (3) provides location service for any and all applications requiring it, including and especially emergency calling service (i.e., called E911 in North America, and other geographic regions); and (4) and provides, stores, manipulates, and secure locations in either room/building/postal address (physical geographic location) format or geo-coordinates (e.g., (X,Y, Z) etc.) referent to any generally accepted reference datum like WGS-84 (GPS, etc.).

Enhanced Emergency Location Enterprise Information Tracking

It is very difficult to track the locations of user's in an emergency situation on an enterprise level. It is also very difficult to notify other users within the physical boundaries of an enterprise when an emergency occurs. As is known in the art, an "enterprise" includes an agency-wide framework for incorporating business processes, information flows, applications, and infrastructure to support agency goals. Examples of enterprises are college campuses, shopping malls, individual offices in a large multi-story office building, etc.

For example, if an emergency situation (e.g., shooting, terrorist event, hostage situation, weather emergency, fire, etc.) occurred on a college campus, it is desirable to notify, the students and faculty who are physically located on the college campus, the police, parents of the students, etc. that an emergency situation is occurring.

A set of device applications 26, targeted at location-capable smartphone devices (e.g., Apple iPhone, RIM Blackberry, and devices running Google Android, etc.), and associated set server applications 26 that provide different types of data in response to certain emergency action triggers, like dialing 9-1-1 (i.e., placing an emergency phone call, etc.) from the device or as a result of the device crossing certain defined "boundaries" that mark off content "zones," as defined by the device location (so-called "geo fencing") are included.

The data provided by the applications can take many forms, including call notification, map data conveyance, location-based advertising, school-schedule-related information, and the like, and can be "pushed" to several different relevant parties, such as parents wishing to be notified of a dependent student's 9-1-1 call, a student or consumer wishing to receive relevant location-sensitive data, like local advertising (from a service to which the user has subscribed) or campus-related information, or emergency services personnel on a campus or other enterprise situation that a 9-1-1 call, for example, has been placed somewhere within their "zone of responsibility."

Device applications can also be set to use "store and forward" techniques, especially storing and saving, with user permission, location data that can be used for various post-facto analyses, like traffic pattern analysis (either by storing on device and downloading periodically, or providing device location at a specified duty cycle period back to a server platform) for users in a large office or campus setting or for the purposes of "tuning" "push" information offered to service users.

Device Applications: monitoring applications have been developed that each targeted at a specific device type (e.g., iPhone, Blackberry, etc. that monitors both location of the device owner/user, and significant events, like the placing of a call using a specific dial string (e.g., 9-1-1), for the purposes of triggering, via a companion server component, user-relevant events. For example, in the case of a "9-1-1 Alert Service" enabled by such an application, the application would perform the actions listed in Table 6. However, the present invention is not limited to such an embodiment and other embodiments can also be used to practice the invention.

TABLE 6 a.) TRACK DEVICE LOCATION via:

1. device APIs (thus giving access to any location sensor data present on the device like GPS or WiFi)
2. network "location APIs" provided by the cellular carriers (where their own network equipment either calculates the device location, or obtains it directly from the device, but it only provided by the network and not on the device itself), or,
3. for devices or networks that cannot supply this information, via a native application component that actually pulls the WiFi Received Signal Strengths from the device and sends them to the server for calculation of device location, and b.) MONITOR DEVICE EVENTS via:

1. In this case, 9-1-1 calls, either via dial-pad monitoring, notification from the device Operating System (OS), or via an application component (e.g., an application that enables "Red Button" one-touch dialing of 9-1-1, etc.).

A description of a university/campus-based scenario follows to illustrate the operation of the invention is listed in Table 7. However, the present invention is not limited to such an embodiment and other embodiments can also be used to practice the invention.

TABLE 7

1.) A user, subscribed to the "9-1-1 Alert Service" is provided with an application for their device of choice (e.g., Apple, Blackberry, or Android-enabled device) via download either from the device manufacturer's application store OR via a service offered by the university itself.
2.) Once user downloads the application, and signs up for the service, other authorized users, like the student's parent or guardian, can sign up to have "alerts" for significant events, like the student's dialing of 9-1-1 for whatever reason, sent to them via such methods as e-mail or SMS messaging to their cell phone.
3.) The application on the device monitors the user's location, either through device APIs or via a native capability (for example, for WiFi-enabled devices, though other technologies could be included in this setup) and the user's phone application for such events as a 9-1-1 call.
4.) When a 9-1-1 call is made, the device application senses it, pulls location from the device or network APIs (whichever is available and applicable, or sends location parameters to the server if device- or network-level APIs are not provided by the manufacturer or service provider) and send either the location and/or parameters, and indication that 9-1-1 has been dialed to a Location Server platform, which is located on the university network.
5.) The server looks to see who is subscribed to alerts (e.g., parents, campus police, etc.) and send out the alert, along with location data, that a 9-1-1 call has been made.
6.) Optionally, the RedSky location server can also push other data, like map/graphical location data to those subscribed to and capable of receiving such data.

Server Applications: A location services platform server (e.g., 20, 22, 24, 116) includes an application 26 that receives location data from devices (for those capable of providing it) and/or location parameters calculates device location (when the device either cannot provide location via a device API). Such a server application uses both this location data, and the notification of significant device events from the device application (like the dialing of a 9-1-1 call) to "push" relevant data, like alerts, advertising, or other locally-significant content to either the user themselves OR to other cognizant parties who might be interested and/or authorized via subscription, via the server component portal, to relevant and permitted (by the user) events.

In one embodiment, server network devices include a gateway, including gateway 116 described above. However, the present invention is not limited to such an embodiment and the server network device is not required to include gateways.

The example above focused on a university-targeted "9-1-1 alert service" use case. Other uses are possible, in other markets, for this generic platform. Some of these uses are illustrated in Table 8. However, the present invention is not limited to such an embodiment and other embodiments can also be used to practice the invention.

TABLE 8

Closely related to the university/campus "9-1-1 alerting service" application, this emergency notification system is used in other verticals, like the retail industry and hospitality industry. In the retail industry, a user of a device (dual use in this case), dialing 9-1-1 over a cellular network (or other significant event), and the native location application (in this case using WiFi to trilaterate a user's location or using hotspot location as an analog for user location) determines location (potentially more accurate) using WiFi and then notifies the retail store internal security desk (local, regional, or centralized) that a 9-1-1 call, or other significant event that requires their attention, has occurred.
Monitoring location and user actions, with user permission, like web surfing behavior so as to notify server and push locally-relevant content, like advertising or campus-event-related information.
User location tracking, with user permission, for the purposes of keeping track of user "buddies" using different types of mobile social networking, or the like.
Aforementioned traffic pattern analysis, which would enable system providers to monitor macro-trends in user location activity, in order to "fine tune" content provided by system to users.

Emergency Information Location Gateway

Figure 12A:
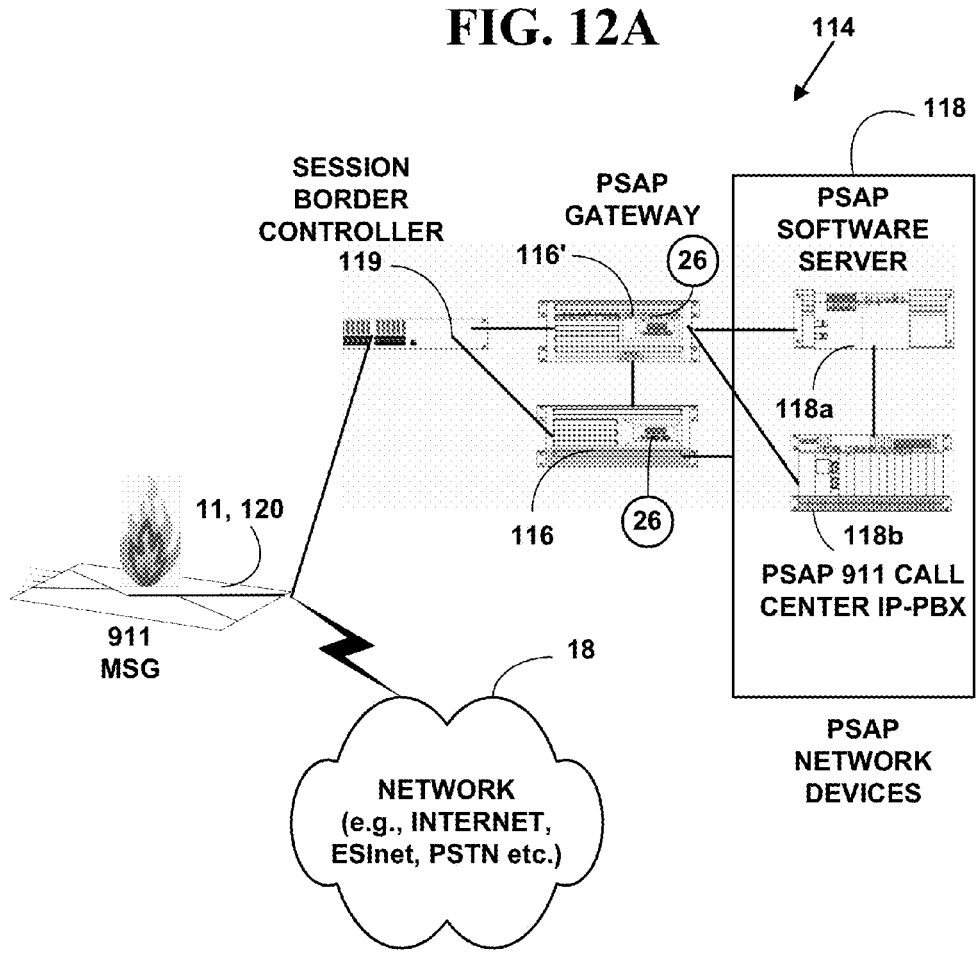

FIGS. 12A and 12B are a block diagram 114 illustrating emergency location information gateway components. FIGS. 12A and 12B illustrate a Public Safety Answering Point (PSAP) gateway 116 including location application 26, a PSAP network including other PSAP network devices 118 including a PSAP software server network device 118a and a PSAP IP-PBX 118b. A session border controller 119 is also illustrated. However, a session border controller 119 is not necessary to practice the invention. An exemplary 911 message 120 is also illustrated in FIG. 12A. FIG. 12B illustrates additional details of the exemplary 911 message 120, including embedded SIP emergency location information. An exemplary legacy 911 message 11 (i.e., not a NG911 message) is illustrated schematically in FIG. 1.

In FIG. 12A, the PSAP gateway network device 116 is a gateway network device including location application 26 that provides Public Safety Answering Points (PSAPs) 118 with the capability to receive NG911-compliant (i.e., SIP-based VoIP) emergency calls and other 911 emergency calls included in FIG. 12B embedded emergency location information 120 (e.g., 911, E911, NG911, etc.) even if their current call-taking Customer Premise Equipment (CPE) cannot strip out this imbedded location and display it on the call-taker's screen. The emergency location information gateway 116 hereinafter is referred to as a PSAP gateway 116.

While traditional Automatic Location Information (ALI) and Dynamic (D-ALI) databases use a 10-digit phone number as the unique key associated with a physical location and require that the physical location be pre-defined in a database so that it can be matched up with the ANI supplied on an incoming phone call, Next Generation 911 ("i3") SIP-VoIP-based emergency calls include embedded physical location information within the SIP call session control messages themselves. Such SIP call session control calls are used in an Emergency Services IP Network (ESInet) 18. This allows physical locations of mobile target network devices 12, 14, 16 to be immediately determined.

Emergency calls from mobile target network devices 12, 14, 16 present a challenge to existing PSAP implementations, namely, how to extract physical location information for the mobile target network device from the SIP messaging of a VoIP call while avoiding any costly upgrades to CPEs until NG911 standards are "fully decided" and system fully designed into full-scale PSAP CPE suites and ready for full-scale deployment. The PSAP gateway 116 with location application 26 described herein correctly handles NG911 emergency calls for legacy as well as brand new PSAP systems.

Figure 13B:
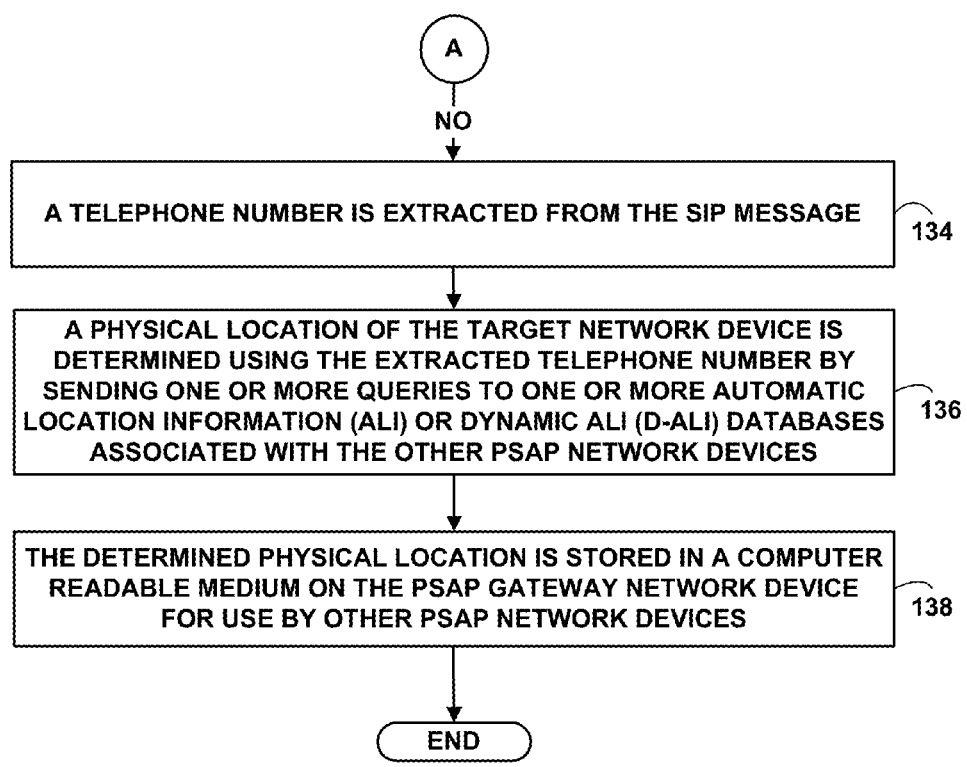

FIGS. 13A and 13B are a flow diagram illustrating a Method 122 for receiving emergency calls with embedded emergency location information. In FIG. 13A at Step 124, a 911 message is received for an emergency event on a location application on a Public Safety Answering Point (PSAP) gateway network device with one or more processors from a target network device with one or more processors via a communications network. The PSAP gateway network device is connected to other PSAP network devices and intercepts and monitors all emergency message communications received via the communications network for the other PSAP network device. At Step 126, a test is conducted to determine on the location application on the PSAP gateway whether the 911 message includes embedded Session Initiation Protocol (SIP) emergency location information for the target network device which sent the 911 message for the emergency event. And if so, at Step 128, the embedded SIP emergency location information in the SIP message is extracted via the location application on the PSAP gateway network device. At Step 130, a physical location of the target network device is determined from the extracted embedded SIP emergency location information. At Step 132, the determined physical location is stored in a computer readable medium on the PSAP gateway network device for use by other PSAP network devices. For the test at 126, if the 911 message does not included embedded SIP emergency location information, than in FIG. 13B at Step 134, a telephone number is extracted from the SIP message. At Step 136, a physical location of the target network device is determined using the extracted telephone number by sending one or more queries to one or more Automatic Location Information (ALI) or Dynamic ALI (D-ALI) databases associated with the other PSAP network devices. At Step 138, the determined physical location of the target network device is saved in a computer readable medium on the PSAP gateway network device for use by other PSAP network devices.

Method 122 is illustrated with one exemplary embodiment. However, the present invention is not limited to such an embodiment and other embodiments can also be used to practice the invention.

In such an exemplary embodiment at FIG. 13A at Step 124, a 911 message (e.g., 911, E911, NG-911, etc.) is received for an emergency event (e.g., fire, accident, medical emergency, shooting, fight, riot, terrorist event, etc.) on a location application 26 on a Public Safety Answering Point (PSAP) gateway network device 116 with one or more processors from a target network device 12, 14, 16 with one or more processors via a communications network 18 (e.g., ESInet network 18, etc.). The PSAP gateway network device 116 is connected to other PSAP network devices 118 and monitors all emergency message communications received via the communications network 18 for the other PSAP network devices 118.

In such an exemplary embodiment, at Step 124, the PSAP gateway 116 is a gateway network device including location application 26 that resides on the PSAP 118 premises and is connected to other PSAP VoIP-enabled network device and other PSAP network devices 118 (e.g., switches, routers, etc.) The location application 26 on the PSAP gateway network device 116 intercepts and monitors all 911 emergency calls (e.g., 911, E911, NG-911, etc.), examining all message traffic that is being passed to the PSAP at Step 124.

At Step 126, a test is conducted to determine on the location application 26 on the PSAP gateway network device whether the 911 message includes embedded Session Initiation Protocol (SIP) emergency location information 120 (e.g., embedded SIP-VoIP information, etc.) for the target network device 12, 14, 16 which sent the 911 message for the emergency event.

And if so, at Step 128, the embedded SIP emergency location information 120 in the SIP message is extracted via the location application 26 on the PSAP gateway network device 116.

In one embodiment, the embedded Session Initiation Protocol (SIP) emergency location information includes emergency location information in a Presence Information Data Format-Location Object (PIDF-LO) format. In another embodiment, the embedded Session Initiation Protocol (SIP) emergency location information includes emergency location information in an Extensible Markup Language (XML) object extension to a Presence Information Data Format-Location Object (PIDF-LO). In yet another embodiment, the embedded Session Initiation Protocol (SIP) emergency location information includes emergency location information in a geo-coordinate (X,Y,Z) format or a Master Street Address Guide (MSAG) format. However, the present invention is not limited to these embodiments and the 911 message can include other types of emergency location information embedded into the SIP message.

Table 9 illustrates an exemplary SIP message with embedded emergency location information 120. However, the present invention is not limited to this exemplary embedded emergency location information and other types of embedded emergency location information can be used to practice the invention.

TABLE 9

```
From: "joesmith"<sip:192.1.1.90>;tag=ffehedbc11
To: <sip:192.1.1.80> Geolocation: <cid:192.1.1.90>
Accept: application/pidf+xml
Cseq: 1 INVITE
Call-Id: 31279398930@192.1.1.90
<?xml version="1.0" encoding="UTF-8"?>
<presence xmlns="urn:ietf:params:xml:ns:pidf"
entity="sip : 192.1. 1. 90">
  <tuple id="lisLocation">
    <status>
      <geopriv>
        <location-info> <civicAddress> <country>USA</country>
        <a1>IL</a1>
        <a3>Chicago</a3> <prd>W</prd> <a6>Chicago Avenue, Suite 300
        </a6><zip>60642</zip>
        <hno>925</hno> <pc>60:41</pc> </civicAddress> </location-info>
      </geopriv>
    </status>
    <timestamp>2009-04-23 17:32:27GMT-05:00</timestamp> </tuple>
</presence>
```

Table 10 illustrates an Extensible Markup Language (XML) object extension to a Presence Information Data Format-Location Object (PIDF-LO) with embedded emergency location information 120. However, the present invention is not limited to this exemplary embedded emergency location information and other types of embedded emergency location information can be used to practice the invention.

TABLE 10

```
From: "joesmith"<sip:192.1.1.90>;tag=ffehedbc11
To: <sip:192.1.1.80> Geolocation: <cid:192.1.1.90>
Accept: application/pidf+xml
Cseq: 1 INVITE
Call-Id: 31279398930@192.1.1.90
<?xml version="1.0" encoding="UTF-8"?>
<presence xmlns="urn:ietf:params:xml:ns:pidf"
entity="sip : 192.1. 1. 90">
  <tuple id="lisLocation">
    <status>
      <geopriv>
        <location-info> <civicAddress> <country>USA</country>
        <a1>IL</a1>
        <a3>Chicago</a3> <prd>W</prd> <a6>Chicago
        Avenue, Suite 300</a6>
        <hno>925</hno>    <pc>60:41</pc>    <zip>60642</zip>
        </civicAddress>
        </location-info>
        <xml extend-location-info>
        <internal><floor>2nd Floor in 2 floor building</floor><office>1st
        office east from NW corner</office><desk>first desk from right-hand
        wall></desk></internal>
(SEE e.g.. LOCATION B, target network device 14, FIG. 1)
        </xm extend-location-info>
      </geopriv>
    </status>
    <timestamp>2009-04-23 T17:32:27GMT-05: 00</timestamp> </tuple>
</presence>
```

At Step 130, a physical location of the target network device 12, 14, 16 is determined from the extracted embedded SIP emergency location information 120 (e.g., Joe Smith, 925 W. Chicago Avenue Suite 235, Chicago, Ill., PC 60 42, SIP identifier (191.1.1.90), caller identifier number 312-793-8930 (from Tables 9, 10) and/or geo-location information ($2^{nd}$ floor in 2 story building $3^{rd}$ office EAST from NW corner).

At Step 132, the determined physical location is stored in a computer readable medium (e.g., RAM, flash, database, etc.) on the PSAP gateway network device 116 for use by other PSAP network devices.

In one embodiment, the PSAP gateway network device 116 immediately sends the SIP-based 911 call on to PSAP PBX/Automatic Call Distributor (ACD) equipment 118, and pushes the extracted SIP emergency location information to existing PSAP 118 ALI display systems for display for an emergency operators. The PSAP gateway network device 116 is compliant with all relevant IETF standards being developed to support IP-based and VoIP-based (i.e., SIP-based) emergency calling. As defined by the Internet Draft Standard "Location Conveyance for the Session Initiation Protocol" the contents of which are incorporated by reference.

In another embodiment, the PSAP gateway network device 116 stores the physical location information and waits for a request from the other PSAP network devices 118 before sending the physical location information.

In another embodiment, the determined physical location for the target network device 12, 14, 16 for the emergency event is displayed on a display on the PSAP gateway network device 116 for an emergency event operator.

For test at Step 126, if a SIP-VoIP call does not include embedded SIP emergency location information 120, in FIG. 13B at Step 134, a 10-digit telephone dial number embedded in the SIP message is extracted on the location application 26 on the PSAP gateway network device 116.

At Step 136, the 10-digit telephone number is utilized to access emergency physical location information stored in traditional ALI or D-ALI databases that is typically displayed on a PSAP 118 display.

At Step 138, the determined physical location of the target network device 12, 14, 16 is saved in a computer readable medium on the PSAP gateway network device 116 for use by other PSAP network devices 118.

The PSAP gateway network device 116 supports all scenarios discussed (and those defined in other IETF standards) including so-called "location by value," where location information is embedded directly in a SIP INVITE message itself, and "location by reference," where the SIP message includes a URI reference to a Location Information Server (LIS) 20, 22, 24 from which the actual location information of the call can be retrieved.

In one embodiment, the PSAP gateway network device 116 includes Sun® Solaris® carrier-class hardware. In another embodiment, the PSAP gateway network device includes Cisco® AS5350 Universal Gateway hardware. The AS5350 is a rack unit gateway supporting two-, four-, or eight-T1/seven-port E1 configurations that provides universal port data, voice, and fax services on any port at any time for IP, VoIP and other voice and data services. However, the present invention is not limited to these specific exemplary embodiments and other embodiments can also be used to practice the invention.

In one embodiment, the PSAP gateway network device 116 is deployed in a redundant pair 116, 116' to eliminate single-points of failure. However, present invention is not limited to this embodiment, on a single PSAP gateway network device 116 can also be used to practice the invention.

In one embodiment, the emergency location information 120 extraction from a SIP-based call includes all standard National Emergency Number version 2 (NENA-2) format address elements (for imbedded civic addresses), including the house number, street name, prefix and suffix elements, city, and state. However, present invention is not limited to this embodiment and other layouts and/or standards can also be used to practice the invention.

In actual implementations on the PSTN, CATV network and/or the Internet, are no specific restrictions on the content of the emergency location information itself, and it is the responsibility of either the entity providing IP, IP voice services (VoIP), the access provider (i.e., wireless, wired telecommunications carrier or Internet Service Provider (ISP), etc.), or the user of the target mobile device 12, 14, 16 themselves to ensure that their emergency location information that is communicated to the PSAP 118 is in a Master Street Address Guide (MSAG) valid format or other valid format to allow a physical location to be quickly determined after an emergency event and a 911 call.

The Presence Information Data Format Location (PIDF-LO) format and the emerging IETF SIP standards also support the conveyance of device location in geo-coordinate (i.e., X,Y,Z, etc.) format as well, so the PSAP gateway network device 116 can also be used to support wireless or other mobile callers who supply their location to the PSAP 118 in (X,Y,Z) format. This data can be stripped out and forwarded on to PSAP 118 Geographic Information Systems (GIS) for display on two dimensional (2D) maps (e.g., street level maps, etc.) or three dimensional (3D) electronic maps (e.g., buildings, building internals, etc). The maps include graphical maps or actual maps (e.g., satellite photos, ground photos, etc.) The PSAP gateway network device 116 location output can either be "pushed" to other software in the PSAP 118 environment, or stored in an embedded database within the PSAP gateway network device 116 and retrieved as needed by the PSAP 118 software.

The PSAP gateway network device 116 provides other PSAP network devices 118 with the capability to receive 911, E911 and/or NG911-compliant (i.e., SIP-based-VoIP, etc.)) emergency calls including embedded emergency location information 120 without upgrades to the other PSAP network device 118 equipment. The 911 and/or E911 may or may not include SIP messages.

In another embodiment, the location application 26 is added directly to the other PSAP network devices 118 and provides the same functionality as the PSAP gateway network device 116.

FIG. 14 is a block diagram 140 of a screen shoot of a PSAP display system 142 displaying physical location information 144 (e.g., Tables 9 and 10, etc.) for a target network device 12, 14, 16 making an 911 call for an emergency event (e.g., fire, target network device 14, physical location B (FIG. 1)) on a display device 146.

PSAP with Legacy 911 Technology

Accommodating legacy technology-based (e.g., Centralized Automatic Message Accounting (CAMA), System Signaling Seven (SS7), Integrated Services Digital Network (ISDN), etc.) emergency calls in a NG911 ESInet network 18 is a challenge to existing 911 call transport networks, as these legacy calls do not contain imbedded emergency location information in a desired SIP format. A Legacy Network Gateway (LNG) with location application 26 described herein solves this problem by converting these calls to a SIP message, accessing a legacy (e.g., ALI database) or network gateway (e.g., LIS) location data source, converting this data (in the case of ALI) to PIDF-LO format, and inserting the emergency location data into the SIP message(s), so that the legacy call may be transported by a NG911 ESInet 18.

Figure 15:
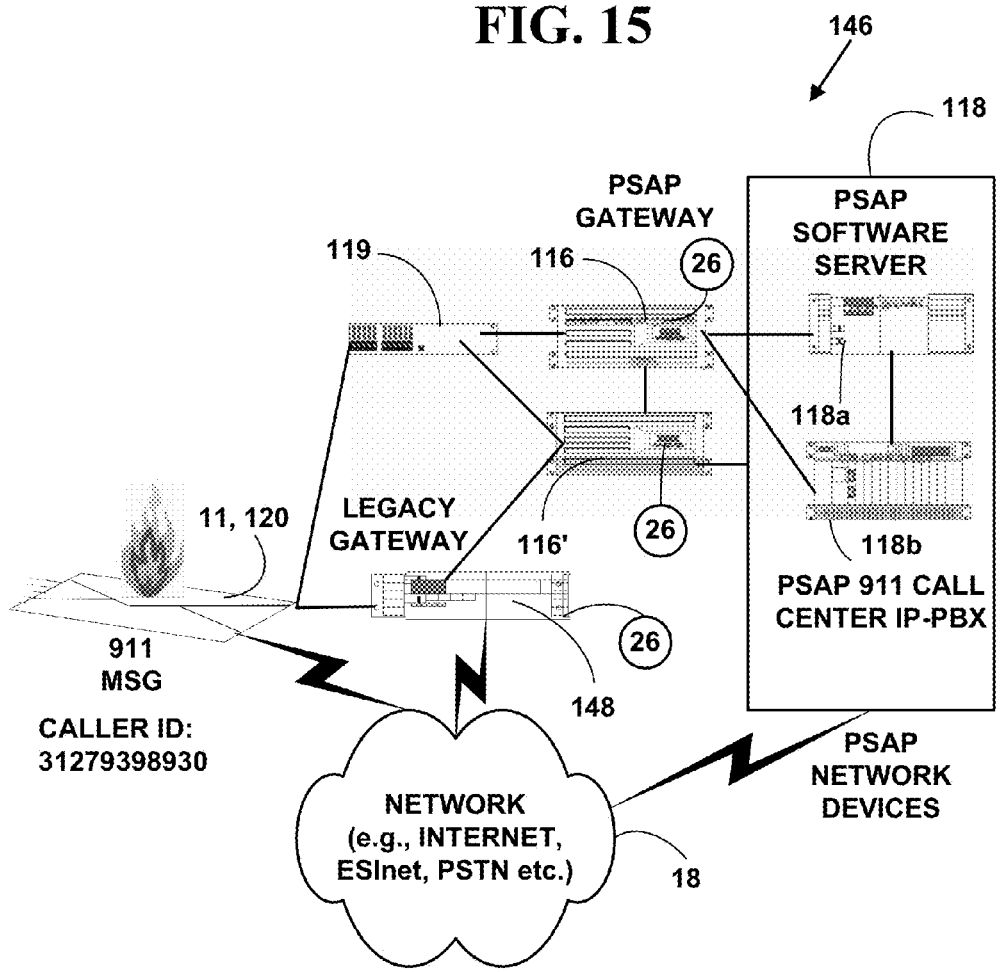
FIG. 15 is a block diagram illustrating emergency location information legacy gateway components.

FIG. 15 is a block diagram 146 illustrating emergency location information legacy gateway 148 components.

In FIG. 15, the legacy network gateway device 148 is a gateway network device including location application 26 that provides signal conversion, and NG location enablement (i.e., taking in a legacy 911 call, converting it to SIP, accessing a location service, either legacy or NG, and creating a NG911 compliant call with imbedded location information) for 911 and E911 emergency calls. Included in FIG. 12B is an example of the embedded emergency location information 120 (e.g., 911, E911, NG911, etc.). This version of the emergency location information gateway 148 hereinafter is referred to as a Legacy Network Gateway (LNG) 148.

Figure 16B:
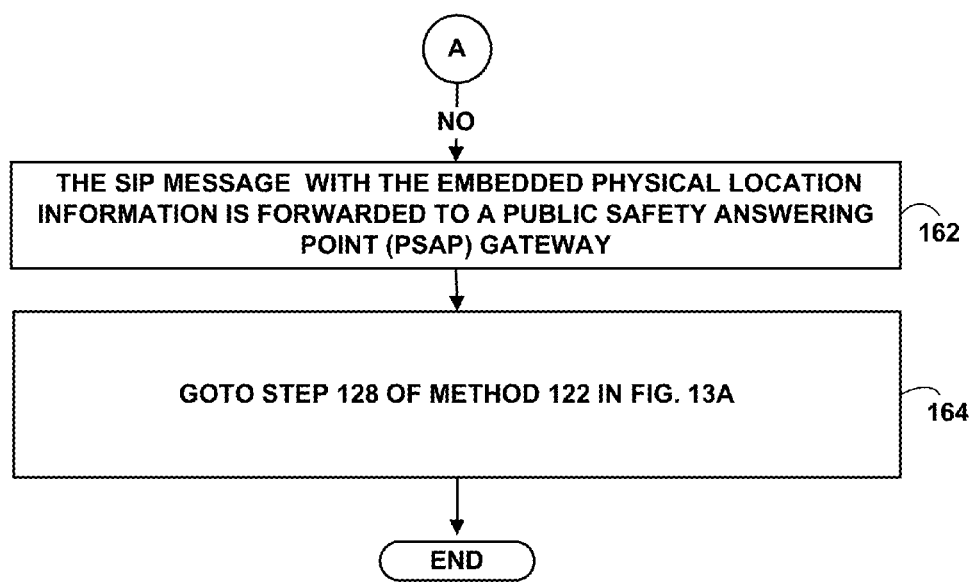

FIGS. 16A and 16B are a flow diagram illustrating a Method 150 for receiving emergency calls without embedded emergency location information.

In FIG. 16A at Step 152, a 911 message is received for an emergency event on a location application on legacy network gateway network device with one or more processors from a target network device with one or more processors via a communications network. The legacy network gateway network device is connected to an Emergency Services IP Network (ESInet) and intercepts and monitors all emergency message communications received via a communications network from legacy sources destined for the ESInet. At Step 154, a test is conducted to determine on the location application on the legacy network gateway network device whether the 911 message includes embedded Session Initiation Protocol (SIP) emergency location information for the target network device which sent the 911 message for the emergency event. And if not, at step 156, a physical location of the target network device is determined from legacy 911 information sent with the legacy 911 message. A physical location of the target network device is determined using an extracted telephone number by sending one or more queries to one or more Automatic Location Information (ALI), Dynamic ALI (D-ALI) databases, or the LIS, associated with the legacy 911 call. At Step 158, the determined physical location of the target network device is saved in a computer readable medium on the legacy network gateway device. At Step 160, the determined physical location is embedded in a SIP message for converting the 911 message into a NG911 message for forwarding on to the ESInet. If at Step 154, the 911 message includes embedded Session Initiation Protocol (SIP) emergency location information for the target network device which sent the 911 message for the emergency event in FIG. 13B at Step 162 the SIP message with the embedded determined physical location of the target network device is forwarded to a PSAP gateway. At Step 164, Method 122 is then executed.

The Method 150 includes receiving emergency 911 messages without embedded emergency location information and transforming them from a legacy 911 messages format 11 (FIG. 1) to NG911 SIP message format 120, determining a physical location of the 911 caller, and converting the legacy 911 call into a NG911 call.

Method 150 is illustrated with one exemplary embodiment. However, the present invention is not limited to such an embodiment and other embodiments can also be used to practice the invention.

In such an exemplary embodiment in FIG. 16A at Step 152, a 911 message/call 11,120 is received for an emergency event on a location application 26 on legacy network gateway (LGN) network device 148 with one or more processors from a target network device 12, 14, 16 with one or more processors via a communications network 18. The LGN network device 148 is connected to an Emergency Services IP Network (ESInet) 18 and intercepts and monitors all emergency message communications received via a communications network from legacy sources destined for the ESInet.

At Step 154, a test is conducted to determine on the location application 26 on the LNG network device 148 whether the 911 message/call 11,120 includes embedded Session Initiation Protocol (SIP) emergency location information for the target network device 12, 14, 16 which sent the 911 message for the emergency event.

And if not, the 911 message/call is a legacy 911 message 11 and not an NG911 message 120 Therefore at step 156, a physical location of the target network device 12, 14, 16 is determined from the legacy 911 information sent with the 911 call message. A physical location of the target network device 12, 14, 16 is determined using an extracted telephone number by sending one or more queries to one or more Automatic Location Information (ALI), Dynamic ALI (D-ALI) databases, or the LIS, associated with the legacy 911 call.

At Step 158, the determined physical location of the target network device 12, 14, 16 is saved in a computer readable medium on the LGN network device 148.

At Step 160, the determined physical location is embedded in a SIP message 144 (e.g., FIG. 14, Tables 9 and 10, etc.) for converting the 911 message into a NG911 message for forwarding on to the ESInet 18.

In one embodiment, the embedded Session Initiation Protocol (SIP) emergency location information includes embedded emergency location information in a Presence Information Data Format-Location Object (PIDF-LO) format. In another embodiment, the embedded Session Initiation Protocol (SIP) emergency location information includes emergency location information in an Extensible Markup Language (XML) object extension to a Presence Information Data Format-Location Object (PIDF-LO). In yet another embodiment, the embedded Session Initiation Protocol (SIP) emergency location information includes emergency location information in a geo-coordinate (X,Y,Z) format or a Master Street Address Guide (MSAG) format. However, the present invention is not limited to these embodiments and the physical location information embedded into the SIP message can include other types of emergency location information embedded into the SIP message.

For the test at Step 154, if the 911 already includes a SIP message with embedded emergency location information 120, in FIG. 13B at Step 162 the SIP message 120 with the embedded determined physical location of the target network device 12, 14, 16 is forwarded to a PSAP gateway 116 (e.g., via session border controller 119, etc.). At Step 164, of Method 122 of FIG. 13A is then executed.

The methods and systems described herein transform legacy 911 calls into NG911 calls, with physical location information included with the call to be handled by ESInet PSAP equipment; and/or (b) transform a location enabled NG911 call back into a traditional 911 call so that it can be handled by legacy PSAP Customer Premises Equipment (CPE). This transforms NG911/legacy 911 calls "in both directions."

In one embodiment, the LGN gateway network device 148 is deployed in a redundant pair of LGN gateway network devices 148, 148' to eliminate single-points of failure for processing 911 messages for emergency events.

The methods and systems described herein provide physical emergency location services for any network device in any access network (e.g., Ethernet, cable, DSL, WiFi, WiMAX, cellular, CATV, PSTN, RFID, mesh, 802.xx.xx, etc.)

The methods and systems described herein provide a emergency location information gateway for public service answering points. The emergency location information gateway provides Public Safety Answering Points (PSAPs) with the capability to receive 911, E911 and NG911-compliant (i.e., Session Initiation Protocol (SIP-based) and/or SIP-Voice over Internet Protocol (VoIP)) and other types emergency calls including embedded emergency location information and determine a physical location of a mobile or non-mobile target network device based on the embedded emergency location information.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A method for receiving emergency calls with embedded emergency location information, comprising:

receiving a 911 message for an emergency event on a location application on a Public Safety Answering Point (PSAP) gateway network device with one or more processors from a target network device with one or more processors via a communications network, wherein the PSAP gateway network device is connected to other PSAP network devices and intercepts and monitors all emergency message communications received via the communications network for the other PSAP network devices, and wherein the PSAP gateway can receive 911 messages from legacy 911 networks and Emergency Services IP networks (ESInet);

determining on the location application on the PSAP gateway network device whether the 911 message includes embedded Session Initiation Protocol (SIP) emergency location information for the target network device which sent the 911 message for the emergency event, and if so, extracting on the location application on the PSAP gateway network device the embedded SIP emergency location information in the SIP message, determining on the location application on the PSAP gateway network device a physical location of the target network device from the extracted embedded SIP emergency location information, saving the determined physical location for the target network device via the location application in a computer readable medium on the PSAP gateway network device for use by other PSAP network devices, and if not, extracting on the location application on the PSAP gateway network device a phone number from the SIP message, determining on the location application on the PSAP a physical location for the target network device using the extracted phone number by sending one or more queries to one or more Automatic Location Information (ALI) or Dynamic ALI (D-ALI) databases associated with the other PSAP network devices;

saving the determined physical location for the target network device via the location application in a computer readable medium on the PSAP gateway network device for use by other PSAP network devices; and determining on the location application on a Public Safety Answering Point (PSAP) gateway network device whether the received 911 message is being sent to a legacy 911 network, and if so, creating a new legacy 911 message with the determined physical location information for the target network device in a format usable on the legacy 911 network, and forwarding the new legacy 911 message for transport and dissemination by the legacy 911 network, and if not, creating a new ESInet 911 message with the determined physical location information for the target network device in a in format usable on the ESInet, forwarding the new ESInet 911 message for transport and dissemination by the ESInet, the location application on the PSAP thereby providing transformation of 911 messages in both inbound and outbound directions including transformation of messages with or without location information included, into new 911 messages with determined physical location information and from a format usable on legacy 911 networks into to a format usable on ESInets and from a format usable on ESInets into a format usable on legacy 911 networks.

2. The method of claim 1 wherein the 911 message includes a 911 message, an Enhanced 911 (E911) message or a NG-911-compliant SIP-based Voice over Internet Protocol (VoIP) message.

3. The method of claim 1 wherein the embedded Session Initiation Protocol (SIP) emergency location information includes emergency location information in a Presence Information Data Format-Location Object (PIDF-LO) format.

4. The method of claim 1 wherein the embedded Session Initiation Protocol (SIP) emergency location information includes emergency location information in a geo-coordinate (X,Y,Z) format or a Master Street Address Guide (MSAG) format.

5. The method of claim 1 wherein the embedded Session Initiation Protocol (SIP) emergency location information includes emergency location information in an Extensible Markup Language (XML) object extension to a Presence Information Data Format-Location Object (PIDF-LO).

6. The method of claim 1 further comprising:

sending the determined physical location from the location application on the PSAP gateway network device to one or more other PSAP network devices; and displaying the determined physical location for the target network device for the emergency event on a display on the one or more other PSAP network devices for an emergency event operator.

7. The method of claim 6 further comprising:

displaying the determined physical location for the target network device for the emergency event on a display on the one or more other PSAP network devices for an using a Geographic Information System (GIS) for displaying the determined physical location on two-dimensional (2D) or three dimensional (3D) electronic maps.

8. The method of claim 1 further comprising:

displaying the determined physical location for the target network device for the emergency event on a display on the PSAP gateway network device for an emergency event operator.

9. The method of claim 1 wherein the embedded SIP emergency location information in the SIP message includes all standard National Emergency Number version 2 (NENA-2) format address elements for imbedded civic addresses, comprising a house number, street name, prefix and suffix elements, city, and state.

10. The method of claim 1 further comprising:

deploying the PSAP gateway network device in a redundant pair of PSAP gateway network devices to eliminate single-points of failure for processing 911 messages for emergency events.

11. One or more processors including a computer readable medium having stored therein a plurality of instructions for causing the one or more processors to execute the steps of:

receiving a 911 message for an emergency event on a location application on a Public Safety Answering Point (PSAP) gateway network device with one or more processors from a target network device with one or more processors via a communications network, wherein the PSAP gateway network device is connected to other PSAP network devices and intercepts and monitors all emergency message communications received via the communications network for the other PSAP network devices, and wherein the PSAP gateway can receive 911 messages from legacy 911 networks and Emergency Services IP networks (ESInet);

determining on the location application on the PSAP gateway network device whether the 911 message includes embedded Session Initiation Protocol (SIP) emergency location information for the target network device which sent the 911 message for the emergency event, and if so, extracting on the location application on the PSAP gateway network device the embedded SIP emergency location information in the SIP message, determining on the location application on the PSAP gateway network device a physical location of the target network device from the extracted embedded SIP emergency location information, saving the determined physical location for the target network device via the location application in a computer readable medium on the PSAP gateway network device for use by other PSAP network devices, and if not, extracting on the location application on the PSAP gateway network device a phone number from the SIP message, determining on the location application on the PSAP a physical location for the target network device using the extracted phone number by sending one or more Queries to one or more Automatic Location Information (ALI) or Dynamic ALI (D-ALI) databases associated with the other PSAP network devices;

saving the determined physical location for the target network device via the location application in a computer readable medium on the PSAP gateway network device for use by other PSAP network devices; and determining on the location application on a Public Safety Answering Point (PSAP) gateway network device whether the received 911 message is being sent to a legacy 911 network, and if so, creating a new legacy 911 message with the determined physical location information for the target network device in a format usable on the legacy 911 network, and forwarding the new legacy 911 message for transport and dissemination by the legacy 911 network, and if not,
creating a new ESInet 911 message with the determined physical location information for the target network device in a in format usable on the ESInet,
forwarding the new ESInet 911 message for transport and dissemination by the ESInet,
the location application on the PSAP thereby providing transformation of 911 messages in both inbound and outbound directions including transformation of messages with or without location information included, into new 911 messages with determined physical location information and from a format usable on legacy 911 networks into to a format usable on ESInets and from a format usable on ESInets into a format usable on legacy 911 networks.

12. A method for receiving emergency calls with embedded emergency location information, comprising:
receiving a 911 message for an emergency event on a location application on a legacy network gateway (LNG) network device with one or more processors from a target network device with one or more processors via a communications network, wherein the legacy network gateway network device is connected to an Emergency Services Internet Protocol (IP) Network (ESInet) and intercepts and monitors all emergency message communications received via a communications network from legacy sources destined for the ESInet;
a test is conducted to determine on the location application on the LNG network device whether the 911 message includes embedded Session Initiation Protocol (SIP) emergency location information for the target network device which sent the 911 message for the emergency event, and
if not,
determining a physical location of the target network device from legacy 911 information sent with the 911 message using an extracted telephone number by sending one or more queries to one or more Automatic Location Information (ALI), Dynamic ALI (D-ALI) databases, or an LIS,
saving the determined physical location of the target network device in a computer readable medium on the LNG network device,
embedding the determined physical location in a Session Initiation Protocol (SIP) message for converting the 911 message into a NG911 message,
forwarding the SIP message with the embedded determined physical location to a Public Safety Answering Point (PSAP) gateway network device with one or more processors on the ESInet;
and if so,
forwarding the 911 message to the PSAP gateway network device with on the ESInet;
receiving a ESInet 911 response message from the ESInet on the location application on the LNG network device for the target network device;
creating a legacy 911 response message for the target network device in a format usable on the communications network, and
forwarding the legacy 911 response message for transport and dissemination by the communications network to the target network device.

13. The method of claim 12 wherein the 911 message includes a 911 message, an Enhanced 911 (E911) message or a NG-911-compliant SIP-based Voice over Internet Protocol (VoIP) message.

14. The method of claim 12 wherein the determined physical location information embedded into the SIP message includes emergency location information in a Presence Information Data Format-Location Object (PIDF-LO) format.

15. The method of claim 12 wherein the determined physical location information embedded into the SIP message includes emergency location information in a geo-coordinate (X,Y,Z) format or a Master Street Address Guide (MSAG) format.

16. The method of claim 12 wherein the determined physical location information embedded into the SIP message includes emergency location information in an Extensible Markup Language (XML) object extension to a Presence Information Data Format-Location Object (PIDF-LO).

17. The method of claim 12 further comprising:
deploying the LGN gateway network device in a redundant pair of LGN gateway network devices to eliminate single-points of failure for processing 911 messages for emergency events.

18. One or more processors including a computer readable medium having stored therein a plurality of instructions for causing the one or more processors to execute the steps of:
receiving a 911 message for an emergency event on a location application on a legacy network gateway (LNG) network device with one or more processors from a target network device with one or more processors via a communications network, wherein the legacy network gateway network device is connected to an Emergency Services Internet Protocol (IP) Network (ESInet) and intercepts and monitors all emergency message communications received via a communications network from legacy sources destined for the ESInet;
a test is conducted to determine on the location application on the LNG network device whether the 911 message includes embedded Session Initiation Protocol (SIP) emergency location information for the target network device which sent the 911 message for the emergency event, and
if not
determining a physical location of the target network device from legacy 911 information sent with the 911 message using an extracted telephone number by sending one or more Queries to one or more Automatic Location Information (ALI), Dynamic ALI (D-ALI) databases, or an LIS,
saving the determined physical location of the target network device in a computer readable medium on the LNG network device,
embedding the determined physical location in a Session Initiation Protocol (SIP) message for converting the 911 message into a NG911 message,
forwarding the SIP message with the embedded determined physical location to a Public Safety Answering Point (PSAP) gateway network device with one or more processors on the ESInet;
and if so,
forwarding the 911 message to the PSAP gateway network device with on the ESInet;
receiving a ESInet 911 response message from the ESInet on the location application on the LNG network device for the target network device;
creating a legacy 911 response message for the target network device in a format usable on the communications network, and forwarding the legacy 911 response message for transport and dissemination by the communications network to the target network device.

19. A system for receiving emergency calls with embedded emergency location information, comprising in combination:

means for receiving a 911 message for an emergency event on a location application on a Public Safety Answering Point (PSAP) gateway network device with one or more processors from a target network device with one or more processors via a communications network, wherein the PSAP gateway network device is connected to other PSAP network devices and intercepts and monitors all emergency message communications received via the communications network for the other PSAP network devices, wherein the PSAP gateway can receive 911 messages from legacy 911 networks and Emergency Services IP networks (ESInet);

means for determining on the location application on the PSAP gateway network device whether the 911 message includes embedded Session Initiation Protocol (SIP) emergency location information for the target network device which sent the 911 message for the emergency event, and if so, means for extracting on the location application on the PSAP gateway network device the embedded SIP emergency location information in the SIP message, means for determining on the location application on the PSAP gateway network device a physical location of the target network device from the extracted embedded SIP emergency location information, and means for saving the determined physical location for the target network device via the location application in a computer readable medium on the PSAP gateway network device for use by other PSAP network devices; and if not, means for extracting on the location application on the PSAP gateway network device a phone number from the SIP message, means for determining on the location application on the PSAP a physical location for the target network device using the extracted phone number by sending one or more queries to one or more Automatic Location Information (ALI) or Dynamic ALI (D-ALI) databases associated with the other PSAP network devices, and means for saving the determined physical location for the target network device via the location application in a computer readable medium on the PSAP gateway network device for use by other PSAP network devices;

means for determining on the location application on the PSAP gateway network device whether the received 911 message is being sent to a legacy 911 network, and if so, means for creating a new legacy 911 message with the determined physical location information for the target network device in a format usable on the legacy 911 network, and means for forwarding the new legacy 911 message for transport and dissemination by the legacy 911 network, and if not, means for creating a new ESInet 911 message with the determined physical location information for the target network device in a in format usable on the ESInet, and means for forwarding the new ESInet 911 message for transport and dissemination by the ESInet, the location application on the PSAP thereby providing means for transformation of 911 messages in both inbound and outbound directions including transformation of messages with or without location information included, into new 911 messages with determined physical location information and from a format usable on legacy 911 networks into to a format usable on ESInets and from a format usable on ESInets into a format usable on legacy 911 networks;

means for sending the determined physical location from the location application on the PSAP gateway network device to one or more other PSAP network devices via a Emergency Services Internet Protocol (IP) Network (ESInet) communications network;

means for deploying the PSAP gateway network device in a redundant pair of PSAP gateway network devices to eliminate single-points of failure for processing 911 messages for emergency events;

means for displaying the determined physical location for the target network device for the emergency event on a display on the one or more other PSAP network devices for an emergency event operator;

means for displaying the determined physical location for the target network device for the emergency event on a display on the one or more other PSAP network devices for an using a Geographic Information System (GIS) for displaying the determined physical location on two-dimensional (2D) or three dimensional (3D) electronic maps;

means for displaying the determined physical location for the target network device for the emergency event on a display on the PSAP gateway network device for the emergency event operator;

means for receiving a 911 message for an emergency event on a location application legacy network gateway (LNG) network device with one or more processors from a target network device with one or more processors via a communications network, wherein the legacy network gateway network device is connected to the ESInet and intercepts and monitors all emergency message communications received via a communications network from legacy sources destined for the ESInet; and means for conducting a test to determine on the location application on the LNG network device whether the 911 message includes embedded Session Initiation Protocol (SIP) emergency location information for the target network device which sent the 911 message for the emergency event, and if not, means for determining a physical location of the target network device from legacy 911 information sent with the 911 message using an extracted telephone number by sending one or more queries to one or more Automatic Location Information (ALI), Dynamic ALI (D-ALI) databases, or a Location Information Service (LIS), means for saving the determined physical location of the target network device in a computer readable medium on the LNG network device, means for embedding the determined physical location in a Session Initiation Protocol (SIP) message for converting the 911 message into a NG911 message, means for forwarding the SIP message with the embedded determined physical location to the PSAP gateway network device with one or more processors on the ESInet; and and if so, means for forwarding the 911 message to the PSAP gateway network device with on the ESInet.

20. The system of claim 19 wherein the embedded SIP emergency location information and the determined physical location information embedded into the SIP message includes physical emergency location information in a Presence Information Data Format-Location Object (PIDF-LO) format, in an Extensible Markup Language (XML) object extension to a Presence Information Data Format-Location Object (PIDF-LO) or in an in a geo-coordinate (X,Y,Z) format or a Master Street Address Guide (MSAG) format.

* * * * *